United States Patent
Pacala et al.

(10) Patent No.: US 12,200,183 B2
(45) Date of Patent: Jan. 14, 2025

(54) OPTICAL SYSTEM FOR COLLECTING DISTANCE INFORMATION WITHIN A FIELD

(71) Applicant: Ouster, Inc., San Francisco, CA (US)

(72) Inventors: Angus Pacala, San Francisco, CA (US); Mark Frichtl, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 0 days.

(21) Appl. No.: 18/613,587

(22) Filed: Mar. 22, 2024

(65) Prior Publication Data

US 2024/0305767 A1 Sep. 12, 2024

Related U.S. Application Data

(63) Continuation of application No. 18/179,559, filed on Mar. 7, 2023, now Pat. No. 11,956,410, which is a (Continued)

(51) Int. Cl.
*H04N 13/218* (2018.01)
*G02B 3/00* (2006.01)
(Continued)

(52) U.S. Cl.
CPC ......... *H04N 13/218* (2018.05); *G02B 3/0056* (2013.01); *G02B 5/005* (2013.01);
(Continued)

(58) Field of Classification Search
CPC ........... H04N 13/0217; H04N 13/0207; H04N 13/0203; H04N 13/0495; H04N 13/0488;
(Continued)

(56) References Cited

U.S. PATENT DOCUMENTS

| 4,358,851 A | 11/1982 | Scifres et al. |
| 4,634,272 A | 1/1987 | Endo |

(Continued)

FOREIGN PATENT DOCUMENTS

| AU | 2017212835 B2 | 6/2019 |
| AU | 2017330180 B2 | 10/2019 |

(Continued)

OTHER PUBLICATIONS

"Complaint for Patent Infringement", *Complaint Ouster, Inc. v. Hesai Group et al.*, 23-cv-00406, Exhibit 1021, Apr. 11, 2023, pp. 1-35.

(Continued)

*Primary Examiner* — John R Lee
(74) *Attorney, Agent, or Firm* — Kilpatrick Townsend & Stockton LLP

(57) ABSTRACT

An optical system for collecting distance information within a field is provided. The optical system may include lenses for collecting photons from a field and may include lenses for distributing photons to a field. The optical system may include lens tubes that collimate collected photons, optical filters that reject normally incident light outside of the operating wavelength, and pixels that detect incident photons. The optical system may further include illumination sources that output photons at an operating wavelength.

20 Claims, 8 Drawing Sheets

Related U.S. Application Data continuation of application No. 17/549,675, filed on Dec. 13, 2021, now Pat. No. 11,627,298, which is a continuation of application No. 16/584,515, filed on Sep. 26, 2019, now Pat. No. 11,202,056, which is a continuation of application No. 16/046,643, filed on Jul. 26, 2018, now Pat. No. 11,190,750, which is a continuation of application No. 15/880,491, filed on Jan. 25, 2018, now Pat. No. 11,025,885, which is a continuation of application No. 15/276,532, filed on Sep. 26, 2016, now Pat. No. 9,992,477.

(60) Provisional application No. 62/232,222, filed on Sep. 24, 2015.

(51) Int. Cl.
*G02B 5/00* (2006.01)
*G02B 5/20* (2006.01)
*G02B 27/46* (2006.01)
*G02B 30/27* (2020.01)

(52) U.S. Cl.
CPC .............. *G02B 5/208* (2013.01); *G02B 27/46* (2013.01); *G02B 30/27* (2020.01)

(58) Field of Classification Search
CPC .. H04N 13/218; G02B 3/0056; G02B 3/0037; G02B 3/0006; G02B 5/005; G02B 5/208; G02B 5/20; G02B 27/2214; G02B 27/22; G02B 6/002; G02B 30/27; G02B 27/46; G01J 1/08; G01J 1/02; G01J 1/0266; G01J 1/029
See application file for complete search history.

(56) References Cited

U.S. PATENT DOCUMENTS

| | | |
|---|---|---|
| 4,676,599 A | 6/1987 | Cruz |
| 4,702,600 A | 10/1987 | Handrich et al. |
| 4,744,667 A | 5/1988 | Fay et al. |
| 4,851,664 A | 7/1989 | Rieger |
| 5,188,286 A | 2/1993 | Pence, IV |
| 5,267,016 A | 11/1993 | Meinzer et al. |
| 5,268,748 A | 12/1993 | Van Hijningen et al. |
| 5,288,992 A | 2/1994 | Fohl |
| 5,659,420 A | 8/1997 | Wakai et al. |
| 5,726,443 A | 3/1998 | Immega et al. |
| 5,953,110 A | 9/1999 | Burns |
| 5,982,552 A | 11/1999 | Nakama et al. |
| 6,014,232 A | 1/2000 | Clarke |
| 6,028,306 A | 2/2000 | Hayashi |
| 6,043,873 A | 3/2000 | Ramer et al. |
| 6,104,516 A | 8/2000 | Majima |
| 6,133,989 A | 10/2000 | Stettner et al. |
| 6,255,133 B1 | 7/2001 | Ormond et al. |
| 6,374,024 B1 | 4/2002 | Iijima |
| 6,414,746 B1 | 7/2002 | Stettner et al. |
| 6,690,019 B2 | 2/2004 | Stettner et al. |
| 6,721,262 B1 | 4/2004 | Jordache et al. |
| 6,747,747 B2 | 6/2004 | Hipp |
| 7,091,462 B2 | 8/2006 | Wilson et al. |
| D531,525 S | 11/2006 | Dold et al. |
| 7,170,542 B2 | 1/2007 | Hanina et al. |
| 7,295,298 B2 | 11/2007 | Willhoeft et al. |
| 7,345,271 B2 | 3/2008 | Boehlau et al. |
| 7,421,159 B2 | 9/2008 | Yang et al. |
| 7,433,042 B1 | 10/2008 | Cavanaugh |
| 7,544,945 B2 | 6/2009 | Tan et al. |
| 7,683,962 B2 | 3/2010 | Border et al. |
| 7,787,105 B2 | 8/2010 | Hipp |
| 7,808,706 B2 | 10/2010 | Fadel et al. |
| 7,873,601 B1 | 1/2011 | Kushwah |
| 7,876,456 B2 | 1/2011 | Sesko |
| 7,969,558 B2 | 6/2011 | Hall |
| 8,013,983 B2 | 9/2011 | Lin et al. |
| 8,089,618 B2 | 1/2012 | Yang |
| 8,130,367 B2 | 3/2012 | Stettner et al. |
| D659,030 S | 5/2012 | Anselment et al. |
| 8,319,949 B2 | 11/2012 | Cantin et al. |
| 8,330,840 B2 | 12/2012 | Lenchenkov |
| 8,374,405 B2 | 2/2013 | Lee et al. |
| 8,384,997 B2 | 2/2013 | Shpunt et al. |
| 8,494,252 B2 | 7/2013 | Freedman et al. |
| 8,504,529 B1 | 8/2013 | Zheng et al. |
| 8,645,810 B2 | 2/2014 | Sharon et al. |
| 8,675,181 B2 | 3/2014 | Hall |
| 8,717,488 B2 | 5/2014 | Shpunt et al. |
| 8,736,818 B2 | 5/2014 | Weimer et al. |
| 8,742,325 B1 | 6/2014 | Droz et al. |
| 8,743,176 B2 | 6/2014 | Stettner et al. |
| 8,761,495 B2 | 6/2014 | Freedman et al. |
| 8,762,798 B2 | 6/2014 | Hu et al. |
| 8,767,190 B2 | 7/2014 | Hall |
| 8,829,406 B2 | 9/2014 | Akerman et al. |
| 8,836,922 B1 | 9/2014 | Pennecot et al. |
| 8,848,039 B2 | 9/2014 | Spektor et al. |
| 8,930,690 B2 | 1/2015 | Zuo et al. |
| 9,041,915 B2 | 5/2015 | Earhart et al. |
| 9,063,549 B1 | 6/2015 | Pennecot et al. |
| 9,071,763 B1 | 6/2015 | Templeton et al. |
| 9,086,273 B1 | 7/2015 | Gruver et al. |
| 9,111,444 B2 | 8/2015 | Kaganovich |
| 9,157,790 B2 | 10/2015 | Shpunt et al. |
| 9,164,511 B1 | 10/2015 | Ferguson et al. |
| 9,176,051 B2 | 11/2015 | Mappes et al. |
| 9,229,109 B2 | 1/2016 | Stettner et al. |
| 9,281,841 B2 | 3/2016 | Chen et al. |
| 9,285,464 B2 | 3/2016 | Pennecot et al. |
| 9,285,477 B1 | 3/2016 | Smith et al. |
| 9,299,731 B1 | 3/2016 | Lenius et al. |
| 9,330,464 B1 | 5/2016 | Ackerman et al. |
| 9,348,018 B2 | 5/2016 | Eisele et al. |
| 9,368,936 B1 | 6/2016 | Lenius et al. |
| 9,369,689 B1 | 6/2016 | Tran et al. |
| 9,383,753 B1 | 7/2016 | Templeton et al. |
| 9,425,654 B2 | 8/2016 | Lenius et al. |
| 9,435,891 B2 | 9/2016 | Oggier |
| 9,470,520 B2 | 10/2016 | Schwarz et al. |
| 9,489,601 B2 | 11/2016 | Fairfield et al. |
| 9,525,863 B2 | 12/2016 | Nawasra et al. |
| 9,529,079 B1 | 12/2016 | Droz et al. |
| 9,551,791 B2 | 1/2017 | Van Den Bossche et al. |
| 9,651,658 B2 | 5/2017 | Pennecot et al. |
| 9,658,463 B2 | 5/2017 | Imamura et al. |
| 9,674,090 B2 | 6/2017 | Caulfield et al. |
| 9,733,344 B2 | 8/2017 | Sim et al. |
| 9,866,241 B2 | 1/2018 | Yen et al. |
| 9,989,406 B2 | 6/2018 | Pacala et al. |
| 9,992,477 B2 | 6/2018 | Pacala et al. |
| 10,063,849 B2 | 8/2018 | Pacala et al. |
| 10,114,110 B2 | 10/2018 | Imai |
| 10,183,541 B2 | 1/2019 | Van Den Bossche et al. |
| 10,199,801 B2 | 2/2019 | Li et al. |
| 10,203,399 B2 | 2/2019 | Retterath et al. |
| 10,222,458 B2 | 3/2019 | Pacala et al. |
| 10,222,475 B2 | 3/2019 | Pacala et al. |
| 10,291,261 B2 | 5/2019 | Yen et al. |
| 10,455,137 B2 | 10/2019 | Saphier et al. |
| 10,557,750 B2 | 2/2020 | Pacala et al. |
| 10,663,586 B2 | 5/2020 | Pacala et al. |
| 10,739,189 B2 | 8/2020 | Pacala et al. |
| 10,760,957 B2 | 9/2020 | Pacala et al. |
| 10,809,359 B2 | 10/2020 | Pacala et al. |
| 10,809,380 B2 | 10/2020 | Pacala |
| 10,841,243 B2 | 11/2020 | Levi et al. |
| 11,025,885 B2 | 6/2021 | Pacala et al. |
| 11,086,013 B2 | 8/2021 | Pacala et al. |
| 11,175,405 B2 | 11/2021 | Pacala et al. |
| 11,178,381 B2 | 11/2021 | Pacala et al. |
| 11,187,802 B2 | 11/2021 | Pacala et al. |
| 11,190,750 B2 | 11/2021 | Pacala et al. |
| 11,196,979 B2 | 12/2021 | Pacala et al. |

(56) References Cited

U.S. PATENT DOCUMENTS

| | | |
|---|---|---|
| 11,202,056 B2 | 12/2021 | Pacala et al. |
| 11,209,544 B2 | 12/2021 | Pacala et al. |
| 11,287,515 B2 | 3/2022 | Pacala et al. |
| 11,300,665 B2 | 4/2022 | Pacala et al. |
| 11,340,336 B2 | 5/2022 | Pacala et al. |
| 11,353,556 B2 | 6/2022 | Pacala et al. |
| 11,422,236 B2 | 8/2022 | Pacala et al. |
| 11,422,265 B2 | 8/2022 | Amelot et al. |
| 11,473,969 B2 | 10/2022 | Pacala et al. |
| 11,473,970 B2 | 10/2022 | Pacala et al. |
| 11,496,599 B1 | 11/2022 | Singh |
| 11,624,835 B2 | 4/2023 | Pacala |
| 11,627,298 B2 | 4/2023 | Pacala et al. |
| 11,695,911 B2 | 7/2023 | Pacala |
| 11,726,204 B2 | 8/2023 | Pacala et al. |
| 11,726,205 B2 | 8/2023 | Pacala et al. |
| 11,733,092 B2 | 8/2023 | Pacala et al. |
| 11,762,093 B2 | 9/2023 | Pacala et al. |
| 11,956,410 B2 * | 4/2024 | Pacala ............... G01S 17/89 |
| 2002/0003617 A1 | 1/2002 | Doemens et al. |
| 2002/0043561 A1 | 4/2002 | Tsikos et al. |
| 2003/0006676 A1 | 1/2003 | Smith et al. |
| 2003/0047752 A1 | 3/2003 | Campbell et al. |
| 2004/0061502 A1 | 4/2004 | Hasser |
| 2004/0223071 A1 | 11/2004 | Wells et al. |
| 2005/0030409 A1 | 2/2005 | Matherson et al. |
| 2005/0046850 A1 | 3/2005 | Chow |
| 2006/0244851 A1 | 11/2006 | Cartlidge |
| 2007/0007563 A1 | 1/2007 | Mouli |
| 2007/0057211 A1 | 3/2007 | Bahlman et al. |
| 2007/0060806 A1 | 3/2007 | Hunter et al. |
| 2007/0228262 A1 | 10/2007 | Cantin et al. |
| 2008/0037114 A1 | 2/2008 | Sheblee et al. |
| 2008/0153189 A1 | 6/2008 | Plaine et al. |
| 2008/0218612 A1 | 9/2008 | Border et al. |
| 2009/0016642 A1 | 1/2009 | Hart |
| 2009/0040629 A1 | 2/2009 | Bechtel et al. |
| 2009/0179142 A1 | 7/2009 | Duparre et al. |
| 2009/0236505 A1 | 9/2009 | Pallaro et al. |
| 2009/0295910 A1 | 12/2009 | Mir et al. |
| 2010/0008588 A1 | 1/2010 | Feldkhun et al. |
| 2010/0020306 A1 | 1/2010 | Hall |
| 2010/0110275 A1 | 5/2010 | Mathieu |
| 2010/0123893 A1 | 5/2010 | Yang |
| 2010/0149389 A1 | 6/2010 | Goto |
| 2010/0204964 A1 | 8/2010 | Pack et al. |
| 2010/0250700 A1 | 9/2010 | O'Brien et al. |
| 2011/0022566 A1 | 1/2011 | Beaverson et al. |
| 2011/0025843 A1 | 2/2011 | Oggier et al. |
| 2011/0032398 A1 | 2/2011 | Lenchenkov |
| 2011/0037849 A1 | 2/2011 | Niclass et al. |
| 2011/0116262 A1 | 5/2011 | Marson |
| 2011/0176565 A1 | 7/2011 | Hutchin |
| 2011/0216304 A1 | 9/2011 | Hall |
| 2011/0228142 A1 | 9/2011 | Brueckner et al. |
| 2011/0283113 A1 | 11/2011 | Moffat et al. |
| 2011/0320865 A1 | 12/2011 | Jain et al. |
| 2012/0044476 A1 | 2/2012 | Earhart et al. |
| 2012/0140109 A1 | 6/2012 | Shpunt et al. |
| 2012/0141104 A1 | 6/2012 | DeLuca |
| 2012/0154914 A1 | 6/2012 | Moriguchi et al. |
| 2012/0182464 A1 | 7/2012 | Shpunt et al. |
| 2012/0287417 A1 | 11/2012 | Mimeault |
| 2012/0320164 A1 | 12/2012 | Lipton |
| 2013/0038941 A1 | 2/2013 | Pesach et al. |
| 2013/0044187 A1 | 2/2013 | Hammes et al. |
| 2013/0044310 A1 | 2/2013 | Mimeault |
| 2013/0110779 A1 | 5/2013 | Taylor et al. |
| 2013/0111262 A1 | 5/2013 | Taylor et al. |
| 2013/0141549 A1 | 6/2013 | Beers et al. |
| 2013/0206967 A1 | 8/2013 | Shpunt et al. |
| 2013/0229646 A1 | 9/2013 | Sakurai |
| 2013/0294089 A1 | 11/2013 | Freedman et al. |
| 2013/0300838 A1 | 11/2013 | Borowski |
| 2013/0300840 A1 | 11/2013 | Borowski |
| 2014/0006354 A1 | 1/2014 | Parkison et al. |
| 2014/0118335 A1 | 5/2014 | Gurman |
| 2014/0118493 A1 | 5/2014 | Sali et al. |
| 2014/0153001 A1 | 6/2014 | Chayat et al. |
| 2014/0158900 A1 | 6/2014 | Yoon et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0267878 A1 | 9/2014 | Geelen et al. |
| 2014/0269796 A1 | 9/2014 | Geske et al. |
| 2014/0285628 A1 | 9/2014 | Shpunt et al. |
| 2014/0291491 A1 | 10/2014 | Shpunt et al. |
| 2014/0313519 A1 | 10/2014 | Shpunt et al. |
| 2014/0375977 A1 | 12/2014 | Ludwig et al. |
| 2014/0376092 A1 | 12/2014 | Mor |
| 2015/0002636 A1 | 1/2015 | Brown |
| 2015/0055117 A1 | 2/2015 | Pennecot et al. |
| 2015/0115130 A1 | 4/2015 | Hsieh et al. |
| 2015/0115131 A1 | 4/2015 | Webster et al. |
| 2015/0124094 A1 | 5/2015 | Loong et al. |
| 2015/0131080 A1 | 5/2015 | Retterath et al. |
| 2015/0184999 A1 | 7/2015 | Stettner |
| 2015/0186287 A1 | 7/2015 | Kass |
| 2015/0192677 A1 | 7/2015 | Yu et al. |
| 2015/0260830 A1 | 9/2015 | Ghosh et al. |
| 2015/0292948 A1 | 10/2015 | Goldring et al. |
| 2015/0293224 A1 | 10/2015 | Eldada et al. |
| 2015/0316473 A1 | 11/2015 | Kester et al. |
| 2015/0319349 A1 | 11/2015 | Mishra et al. |
| 2015/0355470 A1 | 12/2015 | Herschbach |
| 2015/0358601 A1 | 12/2015 | Oggier |
| 2015/0362585 A1 | 12/2015 | Ghosh et al. |
| 2015/0378241 A1 | 12/2015 | Eldada |
| 2015/0379371 A1 | 12/2015 | Yoon et al. |
| 2016/0003946 A1 | 1/2016 | Gilliland et al. |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047901 A1 | 2/2016 | Pacala et al. |
| 2016/0047903 A1 | 2/2016 | Dussan |
| 2016/0049765 A1 | 2/2016 | Eldada |
| 2016/0097858 A1 | 4/2016 | Mundhenk et al. |
| 2016/0150963 A1 | 6/2016 | Roukes et al. |
| 2016/0161600 A1 | 6/2016 | Eldada et al. |
| 2016/0218727 A1 | 7/2016 | Maki |
| 2016/0232019 A1 | 8/2016 | Shah et al. |
| 2016/0265902 A1 | 9/2016 | Nawasra et al. |
| 2016/0274223 A1 | 9/2016 | Imai |
| 2016/0291134 A1 | 10/2016 | Droz et al. |
| 2016/0306032 A1 | 10/2016 | Schwarz et al. |
| 2016/0327639 A1 | 11/2016 | Albert et al. |
| 2016/0327779 A1 | 11/2016 | Hillman |
| 2016/0328619 A1 | 11/2016 | Yi et al. |
| 2016/0330112 A1 | 11/2016 | Raindel et al. |
| 2016/0380896 A1 | 12/2016 | Caulfield et al. |
| 2017/0038459 A1 | 2/2017 | Kubacki et al. |
| 2017/0040368 A1 | 2/2017 | Grzesik |
| 2017/0146640 A1 | 5/2017 | Hall et al. |
| 2017/0219426 A1 | 8/2017 | Pacala et al. |
| 2017/0219695 A1 | 8/2017 | Hall et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0289524 A1 | 10/2017 | Pacala et al. |
| 2017/0299700 A1 | 10/2017 | Pacala et al. |
| 2017/0303829 A1 | 10/2017 | Cohen et al. |
| 2017/0350983 A1 | 12/2017 | Hall et al. |
| 2018/0032396 A1 | 2/2018 | Sharon et al. |
| 2018/0038959 A1 | 2/2018 | Akatsu et al. |
| 2018/0059222 A1 | 3/2018 | Pacala et al. |
| 2018/0152691 A1 | 5/2018 | Pacala et al. |
| 2018/0167602 A1 | 6/2018 | Pacala et al. |
| 2018/0209841 A1 | 7/2018 | Pacala et al. |
| 2018/0285288 A1 | 10/2018 | Bernat et al. |
| 2018/0299554 A1 | 10/2018 | Van Dyck et al. |

(56) References Cited

U.S. PATENT DOCUMENTS

| | | |
|---|---|---|
| 2018/0306907 A1 | 10/2018 | Pacala et al. |
| 2018/0329065 A1 | 11/2018 | Pacala et al. |
| 2019/0018111 A1 | 1/2019 | Pacala et al. |
| 2019/0042741 A1 | 2/2019 | Abodunrin et al. |
| 2019/0044866 A1 | 2/2019 | Chilikin et al. |
| 2019/0097653 A1 | 3/2019 | Zhang et al. |
| 2019/0103885 A1 | 4/2019 | Chang et al. |
| 2019/0109793 A1 | 4/2019 | Dalal |
| 2019/0288713 A1 | 9/2019 | Kumar et al. |
| 2020/0021532 A1 | 1/2020 | Borikar et al. |
| 2020/0036959 A1 | 1/2020 | Pacala et al. |
| 2020/0041646 A1 | 2/2020 | Pacala et al. |
| 2020/0116559 A1 | 4/2020 | Pacala et al. |
| 2020/0116560 A1 | 4/2020 | Pacala et al. |
| 2020/0116836 A1 | 4/2020 | Pacala et al. |
| 2020/0201624 A1 | 6/2020 | Halder et al. |
| 2020/0209355 A1 | 7/2020 | Pacala et al. |
| 2020/0278892 A1 | 9/2020 | Nainar et al. |
| 2020/0314011 A1 | 10/2020 | Deval et al. |
| 2021/0019270 A1 | 1/2021 | Li et al. |
| 2021/0117360 A1 | 4/2021 | Kutch et al. |
| 2022/0201267 A1 | 6/2022 | Pacala et al. |
| 2022/0268893 A1 | 8/2022 | Pacala et al. |
| 2022/0329520 A1 | 10/2022 | Degrace et al. |
| 2022/0329528 A1 | 10/2022 | Degrace et al. |
| 2022/0353240 A1 | 11/2022 | Mcdowall et al. |
| 2023/0319253 A1 | 10/2023 | Pacala et al. |

FOREIGN PATENT DOCUMENTS

| | | |
|---|---|---|
| CN | 101563595 A | 10/2009 |
| CN | 103048046 A | 4/2013 |
| CN | 103234527 A | 8/2013 |
| CN | 103460024 A | 12/2013 |
| CN | 105301865 A | 2/2016 |
| DE | 10153977 B4 | 8/2004 |
| DE | 102004014041 B4 | 4/2006 |
| EP | 0095725 A1 | 12/1983 |
| EP | 2124069 A1 | 11/2009 |
| EP | 2615566 A2 | 7/2013 |
| EP | 2908166 A2 | 8/2015 |
| EP | 3045935 A1 | 7/2016 |
| EP | 3002548 B1 | 9/2016 |
| EP | 3316000 A1 | 5/2018 |
| EP | 3408677 A1 | 12/2018 |
| EP | 3504026 A1 | 7/2019 |
| JP | 036407 A | 1/1991 |
| JP | 0749417 A | 2/1995 |
| JP | 07181023 A | 7/1995 |
| JP | 07318325 A | 12/1995 |
| JP | 09257440 A | 10/1997 |
| JP | 10311950 A | 11/1998 |
| JP | 2004247461 A | 9/2004 |
| JP | 2007103590 A | 4/2007 |
| JP | 2010128122 A | 6/2010 |
| JP | 2012202776 A | 10/2012 |
| JP | 2012530917 A | 12/2012 |
| JP | 2013181912 A | 9/2013 |
| JP | 2015055314 A | 3/2015 |
| JP | 2015137987 A | 7/2015 |
| JP | 2016534346 A | 11/2016 |
| JP | 6314418 B2 | 4/2018 |
| KR | 20070112679 A | 11/2007 |
| KR | 20120137432 A | 12/2012 |
| KR | 20130038388 A | 4/2013 |
| KR | 20150072439 A | 6/2015 |
| WO | 2011063347 A2 | 5/2011 |
| WO | 2012055966 A1 | 5/2012 |
| WO | 2012123152 A1 | 9/2012 |
| WO | 2014150856 A1 | 9/2014 |
| WO | 2015037211 A1 | 3/2015 |
| WO | 2015052616 A1 | 4/2015 |
| WO | 2015136100 A2 | 9/2015 |
| WO | 2015163074 A1 | 10/2015 |
| WO | 2016116733 A1 | 7/2016 |
| WO | 2016125165 A2 | 8/2016 |
| WO | 2017004663 A1 | 1/2017 |
| WO | 2017132704 A1 | 8/2017 |
| WO | 2018057084 A1 | 3/2018 |
| WO | 2018065426 A1 | 4/2018 |
| WO | 2018065427 A1 | 4/2018 |
| WO | 2018065428 A2 | 4/2018 |
| WO | 2018065429 A1 | 4/2018 |
| WO | 2018122415 A1 | 7/2018 |
| WO | 2018197441 A1 | 11/2018 |

OTHER PUBLICATIONS

"Complaint in ITC Inv. No. 337-TA-1363", *Ouster, Inc., Complainant, v. Hesani Group et al.*, Respondents, Exhibit 1020, Apr. 11, 2023, 48 pages.

"Details re Granting Motion for Termination", Certain Lidar (Light Detection and Ranging) Systems and Components Thereof, EDIS Document, ITC Inv. No. 337-TA-1363, Exhibit 1015, Aug. 24, 2023, 2 pages.

"HDL-32E", Data Sheet 2010, Velodyne Lidar, Incorporated, Available Online at: http://pdf.directindustry.com/pdf/velodynelidar/hdl-32e-datasheet/182407-676098.html, 2017, 2 pages.

"HDL-32E", User's Manual 2010, Velodyne Lidar, Incorporated, Available Online at: https://www.yumpu.com/en/document/view/11661149/hdl-32e-manual-velodyne-lidar, Aug. 2016, 28 pages.

"HDL-32E", Velodyne Lidar, Incorporated, Available Online at: http://www.velodynelidar.com/hdl-32e.html, Dec. 6, 2017, 5 pages.

"HDL-64E", Velodyne Lidar, Incorporated, Available Online at: http://www.velodynelidar.com/hdl-64e.html, Dec. 6, 2017, 7 pages.

"HDL-64E S2", Data Sheet, Velodyne Lidar, Inc., Available Online at: https://velodynelidar.com/lidar/products/brochure/%20HDL64E%20S2%20datasheet_2010_lowres, 2017, 2 pages.

"HDL-64E S2 and S2.1", Velodyne Lidar, Incorporated, User's Manual and Programming Guide, Firmware Version 4, 2007, 43 pages.

"HDL-64E S3", Velodyne Lidar, Incorporated, S3 User's Manual and Programming Guide Revision J, Dec. 2017, 54 pages.

"Joint Claim Construction Chart", Inv. No. 337-TA-1363, Exhibit 1026, Jul. 7, 2023, 10 pages.

"Optical Imaging System with a Plurality of Sense Channels", Declaration of James F. Shanley, Declaration in Support of Petition for Inter Partes Review of U.S. Pat. No. 11,190,750, *Hesani Technology Co., Ltd. V. Ouster, Inc.*, Exhibit 1003, Sep. 5, 2023, 158 pages.

"Order Granting Stay", *Ouster, Inc. v. Hesani Group et al.*, 23-406-CFC, Exhibit 1022, May 30, 2023, 2 pages.

"Petition for Inter Partes Review of U.S. Pat. No. 11,178,381", *Hesani Technology Co., LTD v. Ouster, Inc.*, Sep. 5, 2023, 98 pages.

"Petition for Inter Partes Review of U.S. Pat. No. 11,190,750", *Hesani Technology Co., LTD v. Ouster, Inc.*, Sep. 5, 2023, 92 pages.

"Puck Hi-Res", Data Sheet, Velodyne Lidar, Incorporated, Sep. 2016, 14 pages.

"Puck Hi-Res: High Resolution Real-Time 3D LiDAR Sensor", Velodyne Lidar, Incorporated, Available Online at: http://www.velodynelidar.com/vlp-16-hi-res.html, Dec. 13, 2017, 2 pages.

"Puck Lite", Data Sheet, Velodyne Lidar, Incorporated, Feb. 2016, 2 pages.

"Puck Lite User Manual", Velodyne Lidar, Incorporated, Feb. 2016, 49 pages.

"Puck Lite: Light Weight Real-Time 3D LiDAR Sensor", Velodyne Lidar, Incorporated, Available Online at: http://velodynelidar.com/vlp-16-lite.html, Apr. 2016, 2 pages.

"Report to Congress: DARPA Prize Authority", Defense Advanced Research Projects Agency, Fiscal Year 2005 Report in Accordance with 10 U.S.C. 2374a, Exhibit 1037, Mar. 2006, 29 pages.

"Respondent's Proposed Claim Constructions", Inv. No. 337-TA-1363, Exhibit 2002, 7 pages.

"Respondent's Proposed List of Markman Exhibits", Inv. No. 337-TA-1363, Exhibit 2003, 7 pages.

"Respondent's Proposed List of Terms to Be Construed", Inv. No. 337-TA-1363, Exhibit 2001, 6 pages.

(56) References Cited

OTHER PUBLICATIONS

"Ultra Puck VLP-32C", Velodyne Lidar, Incorporated, Available Online at: http://velodynelidar.com/vlp-32c.html, Dec. 13, 2017, 4 pages.
"Velodyne LiDAR Puck", Velodyne Lidar, Incorporated, User's Manual and Programming Guide, 2014, 49 pages.
"VLP-16: Real-Time 3D LiDAR", Velodyne Lidar, Incorporated, Puck, 2014, 2 pages.
"VLP-16: Velodyne LiDAR Puck", Velodyne Lidar, Incorporated, Available Online at: http://www.velodynelidar.com/vlp-16.html, Dec. 6, 2017, 48 pages.
U.S. Appl. No. 15/276,532, Non-Final Office Action, Mailed on Dec. 15, 2017, 15 pages.
U.S. Appl. No. 15/276,532, Notice of Allowance, Mailed on Apr. 11, 2018, 7 pages.
U.S. Appl. No. 15/419,053, "Corrected Notice of Allowability", Mar. 12, 2018, 8 pages.
U.S. Appl. No. 15/419,053, Non-Final Office Action, Mailed on Jul. 28, 2017, 17 pages.
U.S. Appl. No. 15/419,053, Notice of Allowance, Mailed on Jan. 26, 2018, 12 pages.
U.S. Appl. No. 15/861,330, Notice of Allowance, Mailed on May 29, 2018, 11 pages.
U.S. Appl. No. 15/880,491, "Corrected Notice of Allowability", Apr. 13, 2021, 2 pages.
U.S. Appl. No. 15/880,491, "Corrected Notice of Allowability", Apr. 28, 2021, 2 pages.
U.S. Appl. No. 15/880,491, "Corrected Notice of Allowability", Feb. 25, 2021, 2 pages.
U.S. Appl. No. 15/880,491, Non-Final Office Action, Mailed on Nov. 12, 2020, 9 pages.
U.S. Appl. No. 15/880,491, "Notice of Allowability", Mar. 16, 2021, 2 pages.
U.S. Appl. No. 15/934,338, Notice of Allowance, Mailed on Feb. 2, 2021, 7 pages.
U.S. Appl. No. 15/934,338, "Corrected Notice of Allowability", Jan. 13, 2020, 2 pages.
U.S. Appl. No. 15/934,338, Non-Final Office Action, Mailed on May 15, 2019, 16 pages.
U.S. Appl. No. 16/046,643, Notice of Allowance, Mailed on Sep. 17, 2019, 10 pages.
U.S. Appl. No. 16/046,643, "Corrected Notice of Allowability", Oct. 26, 2021, 2 pages.
U.S. Appl. No. 16/046,643, "Corrected Notice of Allowability", Sep. 16, 2021, 2 pages.
U.S. Appl. No. 16/046,643, Non-Final Office Action, Mailed on Feb. 10, 2021, 11 pages.
U.S. Appl. No. 16/046,643, Notice of Allowance, Mailed on Aug. 18, 2021, 10 pages.
U.S. Appl. No. 16/584,515, "Corrected Notice of Allowability", Jun. 10, 2021, 2 pages.
U.S. Appl. No. 16/584,515, "Corrected Notice of Allowability", Jun. 30, 2021, 2 pages.
U.S. Appl. No. 16/584,515, "Corrected Notice of Allowability", Oct. 27, 2021, 2 pages.
U.S. Appl. No. 16/584,515, "Corrected Notice of Allowability", Sep. 16, 2021, 2 pages.
U.S. Appl. No. 16/584,515, Notice of Allowance, Mailed on Mar. 12, 2021, 11 pages.
U.S. Appl. No. 17/317,809, Notice of Allowance, Mailed on Aug. 13, 2021, 9 pages.
U.S. Appl. No. 17/317,809, "Corrected Notice of Allowability", Oct. 27, 2021, 2 pages.
U.S. Appl. No. 17/317,809, "Corrected Notice of Allowability", Sep. 22, 2021, 2 pages.
U.S. Appl. No. 17/317,809, Notice of Allowance, Mailed on Aug. 18, 2021, 13 pages.
U.S. Appl. No. 17/317,809, Optical System for Collecting Distance Information Within a Field, May 11, 2021, 40 pages.
U.S. Appl. No. 17/323,962, Non-Final Office Action, Mailed on Aug. 31, 2021, 9 pages.
U.S. Appl. No. 17/323,962, Notice of Allowance, Mailed on Sep. 29, 2021, 7 pages.
U.S. Appl. No. 17/323,962, Optical System for Collecting Distance Information Within a Field, May 18, 2021, 39 pages.
U.S. Appl. No. 17/549,675, Notice of Allowance, Mailed on Dec. 16, 2022, 11 pages.
U.S. Appl. No. 18/179,559, Notice of Allowance, Mailed on Dec. 7, 2023, 10 pages.
U.S. Appl. No. 18/179,559, Notice of Allowance, Mailed on Aug. 4, 2023, 11 pages.
Au2017212835, "First Examination Report", Sep. 24, 2018, 5 pages.
Au2017212835, "Notice of Acceptance", Feb. 28, 2019, 3 pages.
Au2017212835, "Second Examination Report", Oct. 24, 2018, 3 pages.
Au2017330180, "Notice of Acceptance", Jun. 17, 2019, 3 pages.
Bronzi et al., "100000 Frames/s 64x32 Single Photon Detector Array for 2-D Imaging and 3-D Ranging", Institute of Electrical and Electronics Engineers Journal of Selected Topic in Quantum Electronics, vol. 20, No. 6, Aug. 17, 2014, 10 pages.
Application No. CA3,013,065, Office Action, Mailed on Feb. 7, 2023, 5 pages.
Application No. CA3,013,065, Office Action, Mailed on Oct. 13, 2023, 5 pages.
Charbon et al., "SPAD-Based Sensors", TOF Range-Imaging Cameras, Apr. 9, 2013, pp. 11-38.
Application No. CN201780015714.1, Office Action, Mailed on Jun. 28, 2020, 12 pages.
Application No. CN201780015714.1, Office Action, Mailed on Sep. 28, 2021, 16 pages.
Application No. CN201780015714.1, Office Action, Mailed on Mar. 11, 2021, 18 pages.
CN201780015714.1, "Supplemental Search Report", Mar. 4, 2021, 1 page.
Application No. CN201780068584.8, Office Action, Mailed on Jul. 6, 2021, 12 pages.
Application No. CN201780068584.8, Office Action, Mailed on Nov. 3, 2020, 20 pages.
Contini et al., "Time-Domain Diffuse Optics: Towards Next Generation Devices", Proceedings SPIE Diffuse Optical Imaging V, vol. 9538, Jul. 10, 2015, pp. 95380A1-95380A4.
Cova et al., "Single-Photon Counting Detectors", Institute of Electrical and Electronics Engineers Photonics Journal, vol. 3, No. 2, Apr. 2011, pp. 274-277.
Application No. DKPA201970244, Notice of Decision to Grant, Mailed on Jan. 10, 2022, 2 pages.
Application No. DKPA201970244, Office Action, Mailed on Feb. 12, 2021, 3 pages.
Application No. DKPA201970244, Office Action, Mailed on May 6, 2021, 3 pages.
Application No. DKPA201970244, Office Action, Mailed on Apr. 24, 2020, 8 pages.
Donati , "Photodetectors: Devices, Circuits, and Applications", Measurement Science and Technology 12.5 (2001), Exhibit 1034, Dec. 12, 2020, 46 pages.
Application No. EP17745102.8, Extended European Search Report, Mailed on Sep. 9, 2019, 6 pages.
Application No. EP17745102.8, Office Action, Mailed on Nov. 22, 2023, 3 pages.
Application No. EP17745102.8 , Office Action, Mailed on Dec. 22, 2020, 4 pages.
Application No. EP17745102.8, Office Action, Mailed on Jul. 16, 2020, 4 pages.
Application No. EP17745102.8, Office Action, Mailed on Mar. 6, 2020, 5 pages.
GB1905868.4, "Combined Search and Examination Report", Aug. 6, 2021, 6 pages.
Graf, "Modern Dictionary of Electronics", Newnes publishing, 7th Edition, Aug. 11, 1999, 6 pages.

(56) References Cited

OTHER PUBLICATIONS

Guerrieri et al., "Two-Dimensional SPAD Imaging Camera for Photon Counting", Institute of Electrical and Electronics Engineers Photonics Journal, vol. 2, No. 5, Aug. 16, 2010, pp. 759-774.
Hall et al., "Team DAD Technical Paper", DARPA Grand Challenge, Exhibit 1026, Aug. 26, 2005, pp. 1-12.
In201847031610, "First Examination Report", Jan. 28, 2021, 5 pages.
In201947016029, "First Examination Report", Jun. 9, 2021, 9 pages.
Itzler et al., "Geiger-Mode Avalanche Photodiode Focal Plane Arrays for Three-Dimensional Imaging LADAR", Proceedings of SPIE—The International Society for Optical Engineering, vol. 7808, Aug. 27, 2010, pp. 78080C-1-78080C-14.
Application No. JP2018-559175, Notice of Decision to Grant, Mailed on Aug. 11, 2020, 1 page.
Application No. JP2018-559175, Office Action, Mailed on Dec. 23, 2019, 6 pages.
Application No. JP2019-516177, Office Action, Mailed on Apr. 1, 2021, 10 pages.
Application No. JP2019-516177, Office Action, Mailed on Aug. 10, 2021, 3 pages.
Application No. JP2019-516177, Office Action, Mailed on Jun. 15, 2022, 5 pages.
Kilpela et al., "Precise Pulsed Time-of-Flight Laser Range Finder for Industrial Distance Measurements", Review of Scientific Instruments, vol. 72, No. 4, Apr. 2001, pp. 2197-2202.
Application No. KR10-2019-7011974, Office Action, Mailed on Dec. 16, 2020, 4 pages.
Application No. KR10-2021-7031355, Office Action, Mailed on Oct. 28, 2021, 4 pages.
Kubitscheck ed., "Fluorescence microscopy: from principles to biological applications.", John Wiley & Sons, 2017, 73 pages.
Le et al., "On the Use of Hard-Decision LDPC Decoders on MLC NAND Flash Memory", 15th International Multi-Conference on Systems, Signals & Devices (SSD), Mar. 2018, 6 pages.
Lee et al., "Accuracy-Power Controllable LiDAR Sensor System with 3D Object Recognition for Autonomous Vehicle", Sensors, vol. 20, No. 19, Exhibit 1014, Oct. 7, 2020, pp. 1-20.
Marino et al., "A Compact 3D Imaging Laser Radar System Using Geiger-mode APD Arrays: System and Measurements", Proceedings of SPIE—The International Society for Optical Engineering, vol. 5086, Exhibit 1019, Aug. 2003, pp. 1-16.
Matsubara et al., "Development of Next Generation LiDAR", R&D Review Toyota CRDL, vol. 43, No. 1, Exhibit 1023, Feb. 21, 2012, pp. 7-12.
McManamon, "Field Guide to Lidar", SPIE Press, vol. FG36, Exhibit 1039, Mar. 2015, pp. 1-167.
Application No. PCT/US2017/015683, International Preliminary Report on Patentability, Mailed on Aug. 9, 2018, 12 pages.
Application No. PCT/US2017/015683, International Search Report and Written Opinion, Mailed on Apr. 17, 2017, 12 pages.
Application No. PCT/US2017/039306, International Preliminary Report on Patentability, Mailed on Apr. 4, 2019, 17 pages.
Application No. PCT/US2017/039306, International Search Report and Written Opinion, Mailed on Nov. 7, 2017, 21 pages.
PCT/US2017/039306, "Invitation to Pay Additional Fees and, Where Applicable, Protest Fee", Aug. 31, 2017, 2 pages.
Application No. PCT/US2017/048379, International Search Report and Written Opinion, Mailed on Nov. 2, 2017, 12 pages.
Pedrotti et al., "Excerpts from Introduction to optics.", Cambridge University Press, Third Edition, 2017, pages.
Application No. RU2018130989, Notice of Decision to Grant, Mailed on Dec. 14, 2020, 21 pages.
Application No. RU2018130989, Office Action, Mailed on Sep. 10, 2020, 10 pages.
Application No. RU2018130989, Office Action, Mailed on Apr. 27, 2020, 21 pages.
Application No. SE1950477-8, Office Action, Mailed on Apr. 12, 2021, 4 pages.
Application No. SE1950477-8, Office Action, Mailed on Jan. 27, 2020, 8 pages.
Application No. SG11201806442Y, Notice of Decision to Grant, Mailed on Dec. 22, 2020, 5 pages.
Application No. SG11201806442Y, Written Opinion, Mailed on Jan. 28, 2020, 9 pages.
Application No. SG11201902476W, Notice of Decision to Grant, Mailed on May 18, 2021, 4 pages.
Stone et al., "Performance Analysis of Next-generation LADAR for Manufacturing, Construction, and Mobility", National Institute of Standards and Technology Interagency/Internal Report (NISTIR), Exhibit 1035, May 2004, pp. 1-199.
Application No. TH1801004505, Office Action, Mailed on Aug. 6, 2019, 2 pages.
Yang et al., "Wavelength Tuning of Vertical-Cavity Surface-Emitting Lasers by an Internal Device Heater", IEEE Photonics Technology Letters, vol. 20, No. 20, Oct. 15, 2008, pp. 1679-1681.
Application No. ZA2018/05645, Notice of Allowance, Mailed on Sep. 3, 2019, 1 page.
"Decision Granting Inter Partes Review of U.S. Pat. No. 11,178,381", *Hesani Technology Co., LTD v. Ouster, Inc.*, Apr. 1, 2024, 31 pages.
"Decision Granting Inter Partes Review of U.S. Pat. No. 11,190,750", *Hesani Technology Co., LTD v. Ouster, Inc.*, Apr. 1, 2024, 39 pages.
KR10-2018-7024912, "Office Action", May 23, 2024, 7 pages.
CA3,013,065, "Office Action", Aug. 6, 2024, 3 pages.
CN202210250381.3, "Office Action", Aug. 21, 2024, 10 pages.
Li et al., "Optical Tomography Imaging System of Conical Scan", School of Instrument Science & Opto-electric Engineering, Feb. 15, 2016, 7 pages.

* cited by examiner

OPTICAL SYSTEM FOR COLLECTING DISTANCE INFORMATION WITHIN A FIELD

CROSS-REFERENCE TO RELATED APPLICATIONS

This application is a continuation of U.S. patent application Ser. No. 18/179,559, filed Mar. 7, 2023, which is a continuation of U.S. patent application Ser. No. 17/549,675, filed Dec. 13, 2021, which is a continuation of U.S. patent application Ser. No. 16/584,515, filed Sep. 26, 2019, which is a continuation of U.S. patent application Ser. No. 16/046,643, filed Jul. 26, 2018, which is a continuation of U.S. patent application Ser. No. 15/880,491, filed Jan. 25, 2018, which is a continuation of U.S. patent application Ser. No. 15/276,532 ("the '532 application"), filed Sep. 26, 2016, which claims the benefit of U.S. Provisional Patent Application No. 62/232,222 ("the '222 application") filed Sep. 24, 2015. This application is also related to U.S. patent application Ser. No. 15/861,330, filed on Jan. 3, 2018, which is a continuation-in-part of the '532 application. The disclosures of each of the Ser. Nos. 18/179,559; 17/549,675; 16/584,515; 16/046,643; 15/880,491; 15/276,532; and 62/232,222 applications are incorporated by reference herein in their entirety for all purposes.

BACKGROUND OF THE INVENTION

Field of the Invention

This invention relates generally to the field of optical sensors and more specifically to a new and useful optical system for collecting distance information in the field of optical sensors.

DETAILED DESCRIPTION OF THE PREFERRED EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. One-Dimensional Optical System: Aperture Array

Figure 1:
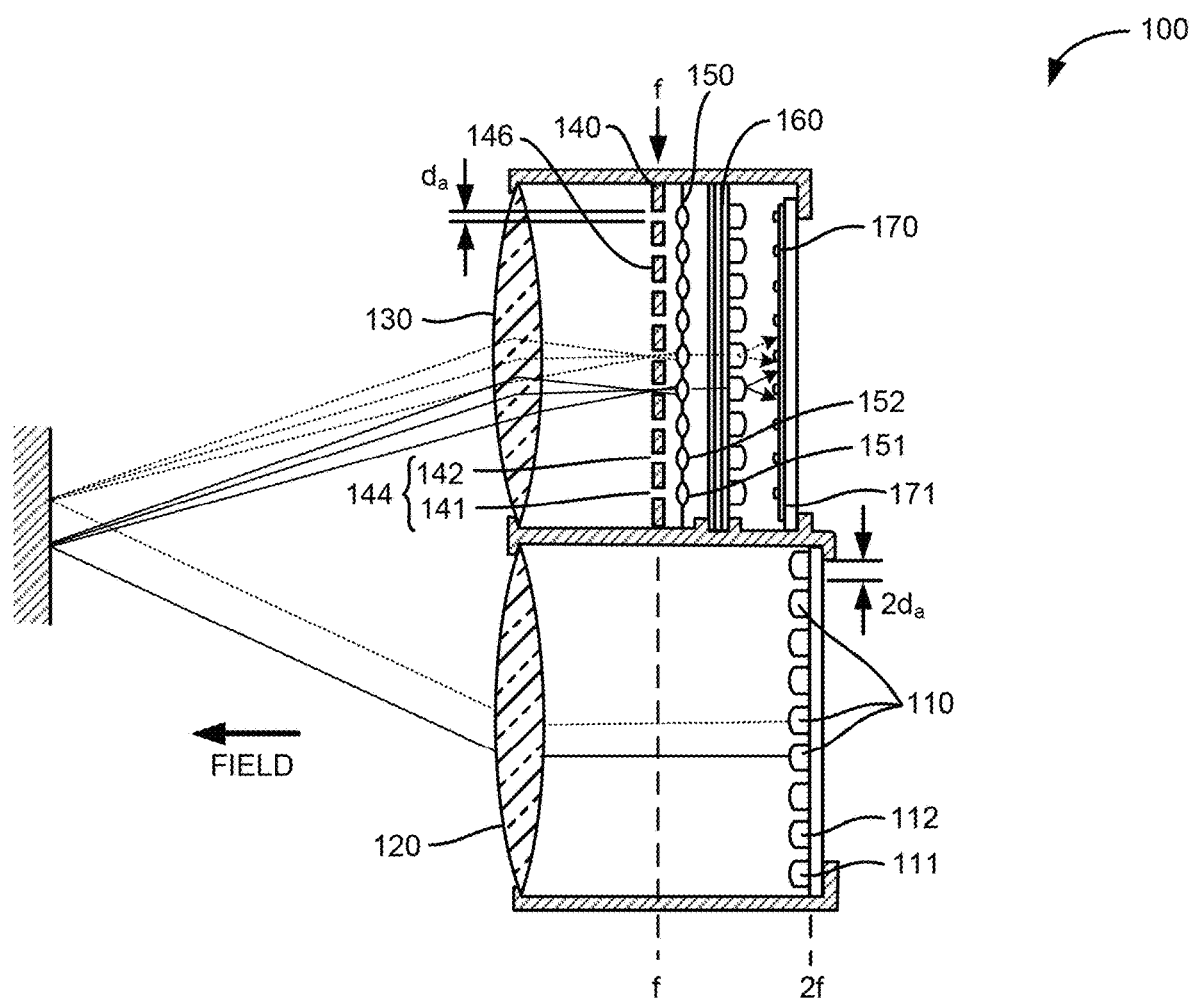
FIG. 1 is a schematic representation of a system.

As shown in FIG. 1, a one-dimensional optical system 100 for collecting distance information within a field includes: a set of illumination sources 110 arranged along a first axis, each illumination source in the set of illumination sources 110 configured to output an illuminating beam of an operating wavelength toward a discrete spot in the field ahead of the illumination source; a bulk imaging optic 130 characterized by a focal plane opposite the field; an aperture layer 140 coincident the focal plane, defining a set of apertures 144 in a line array parallel to the first axis, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer 140 and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

1.1 Applications

Generally, the one-dimensional optical system 100 (the "system") functions as an image sensor that, when rotated about an axis parallel to a column of apertures, collects three-dimensional distance data of a volume occupied by the system. Specifically, the one-dimensional optical system 100 can scan a volume to collect three-dimensional distance data that can then be reconstructed into a virtual three-dimensional representation of the volume, such as based on recorded times between transmission of illuminating beams from the illumination sources and detection of photons-likely originating from the illumination sources-incident on the set of pixels 170, based on phase-based measurements techniques, or based on any other suitable distance measurement technique. The system 100 includes: a column of offset apertures arranged behind a bulk imaging optic 130 and defining discrete fields of view in a field ahead of the bulk imaging optic 130 (that is non-overlapping fields of view beyond a threshold distance from the system); a set of illumination sources 110 that project discrete illuminating beams at an operating wavelength into (and substantially only into) the fields of view defined by the apertures; a column of lenses that collimate light rays passed by corresponding apertures; and an optical filter 160 that selectively passes a narrow band of wavelengths of light (i.e., electromagnetic radiation) including the operating wavelength; and a set of pixels 170 that detect incident photons (e.g., count incident photons, tracks times between consecutive incident photons). The system can therefore selectively project illuminating beams into a field ahead of the system according to an illumination pattern that substantially matches—in size and geometry across a range of distances from the system—the fields of view of the apertures. In particular, the illumination sources are configured to illuminate substantially only surfaces in the field ahead of the system that can be detected by pixels in the system such that minimal power output by the system (via the illumination sources) is wasted by illuminating surfaces in the field for which the pixels are blind. The system can therefore achieve a relatively high ratio of output signal (i.e., illuminating beam power) to input signal (i.e., photons passed to an incident on the pixel array). Furthermore, the set of lenses 150 can collimate light rays passed by adjacent apertures such that light rays incident on the optical filter 160 meet the optical filter 160 at an angle of incidence of approximately 0°, thereby maintaining a relatively narrow band of wavelengths of light passed by the optical filter 160 and achieving a relatively high signal-to-noise ratio ("SNR") for light rays reaching the set of pixels 170.

The system includes pixels arranged in a column and aligned with the apertures, and each pixel can be non-square in geometry (e.g., short and wide) to extend the sensing area of the system for a fixed aperture pitch and pixel column height. The system also includes a diffuser 180 that spreads light rays passed from an aperture through the optical filter 160 across the area of a corresponding pixel such that the pixel can detect incident photons across its full width and height thereby increasing the dynamic range of the system.

The system is described herein as projecting electromagnetic radiation into a field and detecting electromagnetic radiation reflected from a surface in the field back to bulk receiver optic. Terms "illumination beam," "light," "light rays," and "photons" recited herein refer to such electromagnetic radiation. The term "channel" recited herein refers to one aperture in the aperture layer 140, a corresponding lens in the set of lenses 150, and a corresponding pixel in the set of pixels 170.

1.2 Bulk Imaging Optic

The system includes a bulk imaging optic 130 characterized by a focal plane opposite the field. Generally, the bulk imaging optic 130 functions to project incident light rays from outside the system toward the focal plane where light rays incident on a stop region 146 of the aperture layer 140 are rejected (e.g., mirrored or absorbed) and where light rays incident on apertures in the aperture layer 140 are passed into a lens characterized by a focal length and offset from the focal plane by the focal length.

Figure 11:
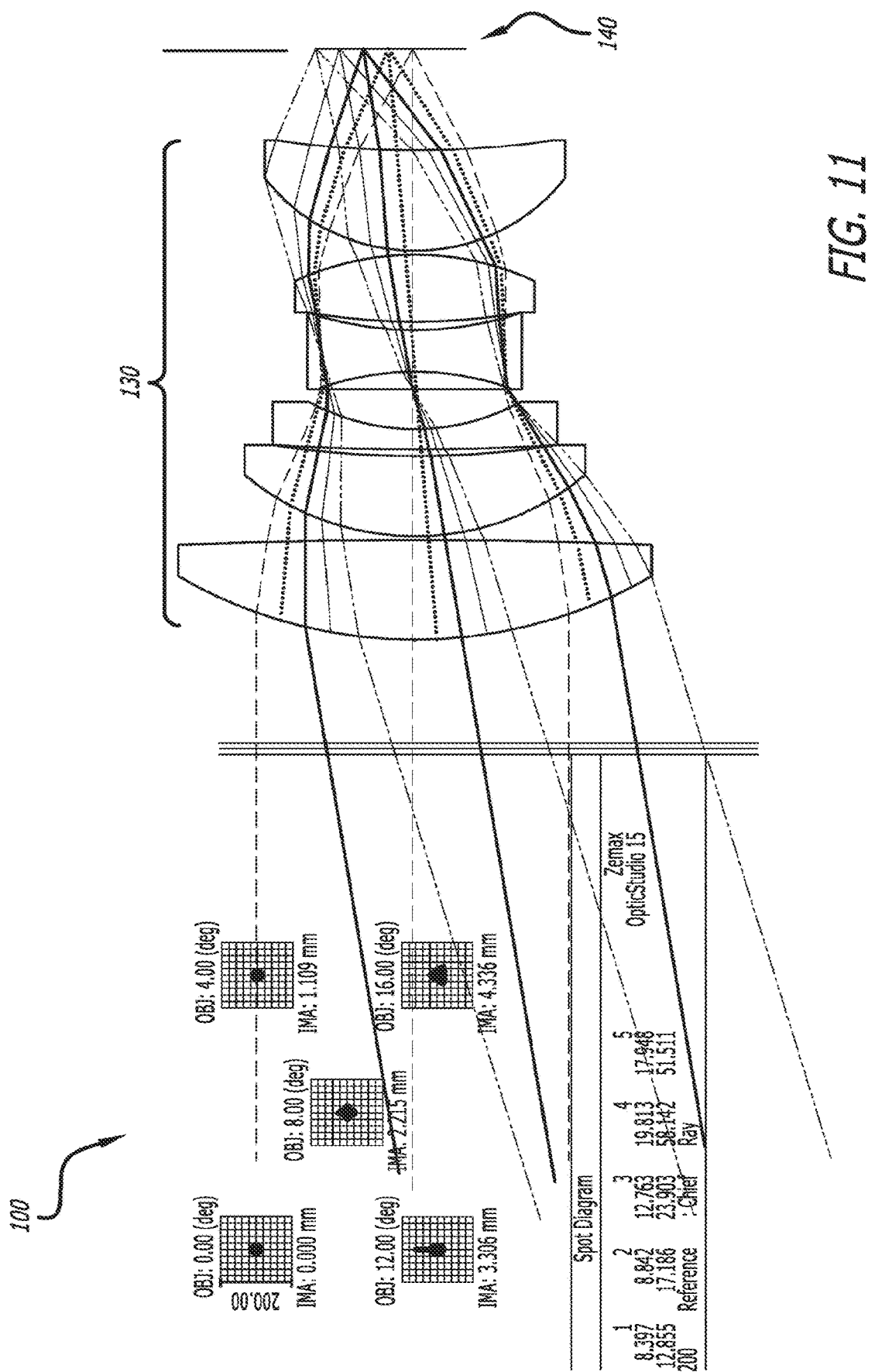
FIG. 11 is a schematic representation in accordance with one variation of the system.

In one implementation, the bulk imaging optic 130 includes a converging lens, such as a bi-convex lens (shown in FIG. 2) or a plano-convex lens, characterized by a particular focal length at the operating wavelength of the system. The bulk imaging optic 130 can also include multiple discrete lens that cooperate to project light rays toward the aperture layer 140 and that are characterized by a composite focal plane opposite the field, as shown in FIG. 11. However, the bulk imaging optic 130 can be any other suitable type of lens or combination of lenses of any other type or geometry.

1.3 Aperture Layer

Figure 2:
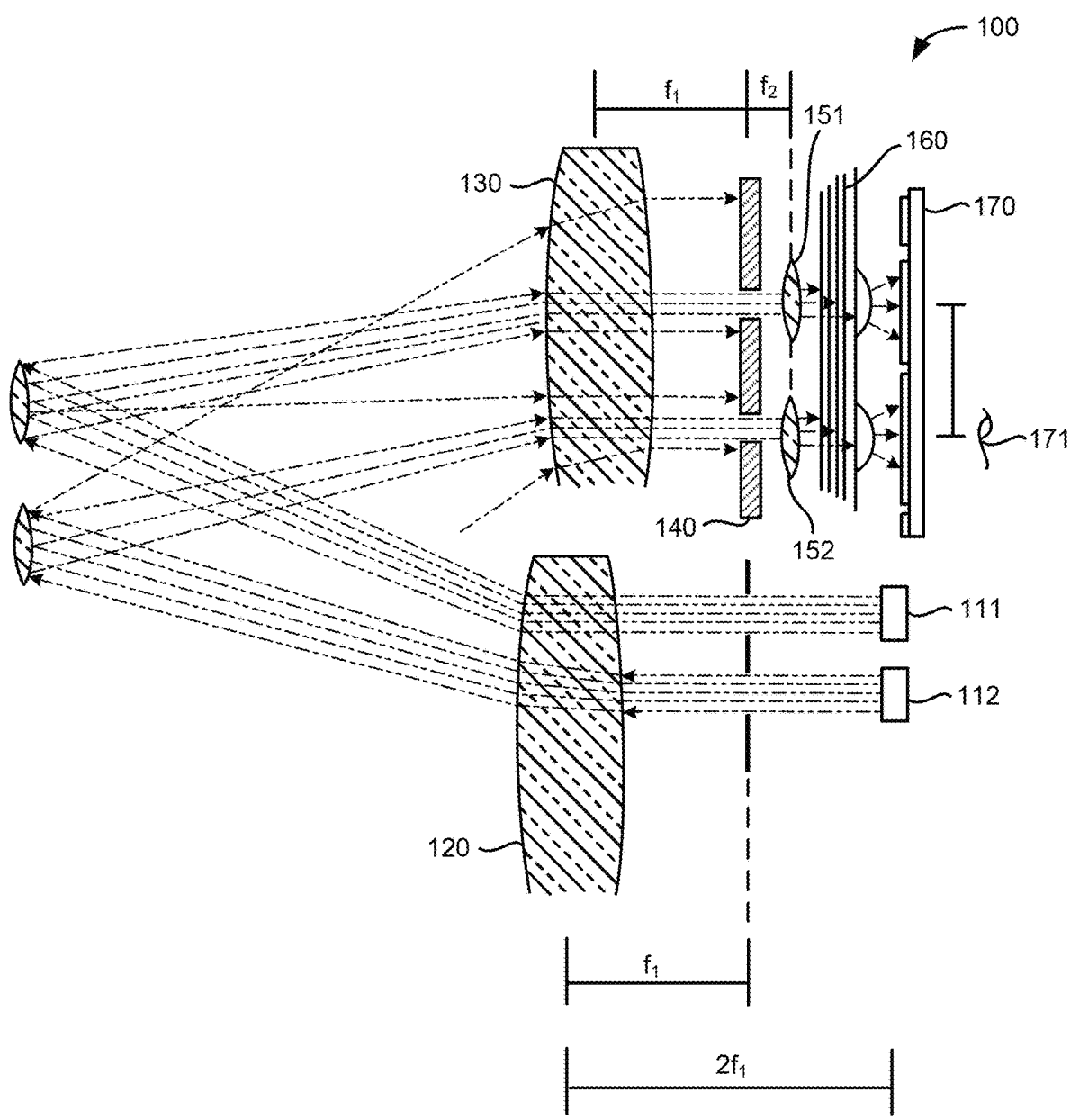
FIG. 2 is a schematic representation in accordance with one variation of the system.
Figure 6:
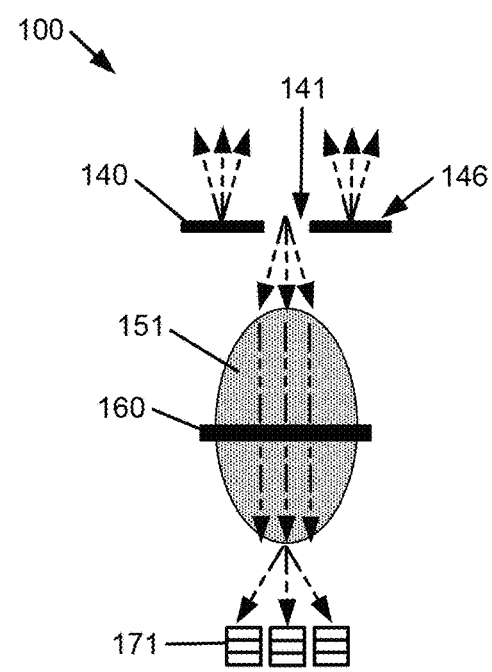
FIG. 6 is a schematic representation in accordance with one variation of the system.

As shown in FIGS. 1 and 2, the system includes an aperture layer 140 coincident the focal plane, defining a set of apertures 144 in a line array parallel to the axes of the illumination sources, and defining a stop region 146 around the set of apertures 144, wherein each aperture in the set of apertures 144 defines a field of view in the field coincident a discrete spot output by a corresponding illumination source in the set of illumination sources 110, and wherein the stop region 146 absorbs and/or reflects light rays reflected from surfaces in the field outside of fields of view defined by the set of apertures 144 and passing through the bulk imaging optic 130. Generally, the aperture layer 140 defines an array of open regions (i.e., apertures, including one aperture per lens) and closed regions ("stop regions") between adjacent opens. Each aperture in the aperture layer 140 defines a "pinhole" that defines a field of view for its corresponding sense channel and passes light rights reflected from an external surface within its field of the view into its corresponding lens, and each stop region 146 can block light rays incident on select regions of the focal plane from passing into the lens array, as shown in FIG. 6.

The aperture layer 140 includes a relatively thin opaque structure coinciding with (e.g., arranged along) the focal plane of the bulk imaging optic 130, as shown in FIGS. 1 and 2. For example, the aperture layer 140 can include a 10 micrometer-thick copper, silver, or nickel film deposited (e.g., plated) over a photocurable transparent polymer and then selectively etched to form the array of apertures. In a similar example, a reflective metalized layer or a light-absorbing photopolymer (e.g., a photopolymer mixed with a light absorbing dye) can be deposited onto a glass wafer and selectively cured with a photomask to form the aperture layer 140 and the set of apertures 144. Alternatively, the aperture layer 140 can include a discrete metallic film that is mechanically or chemically perforated to form the array of apertures, bonded to the lens array, and then installed over the bulk imaging optic 130 along the focal plane. However, the aperture layer 140 can include any other reflective (e.g., mirrored) or light-absorbing material formed in any other way to define the array of apertures along the focal plane of the bulk imaging optic 130.

Figure 3:
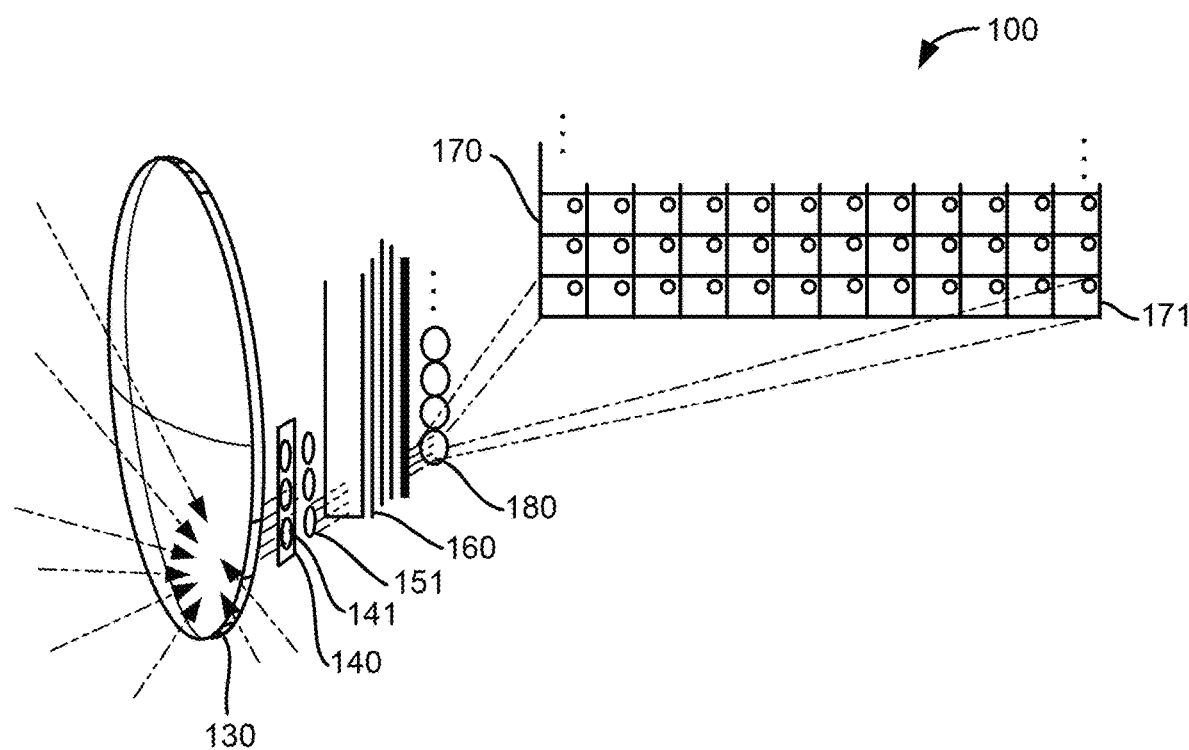
FIG. 3 is a schematic representation in accordance with one variation of the system.

In the one-dimensional optical system 100, the aperture layer 140 can define a single column of multiple discrete circular apertures of substantially uniform diameter, wherein each aperture defines an axis substantially parallel to and aligned with one lens in the lens array, as shown in FIG. 3. Adjacent apertures are offset by an aperture pitch distance greater than the aperture diameter and substantially similar to the lens pitch distance, and the aperture layer 140 defines a stop region 146 (i.e., an opaque or reflecting region) between adjacent apertures such that the apertures define discrete, non-overlapping fields of view for their corresponding sense channels. At increasingly smaller diameters up to a diffraction-limited diameter—which is a function of wavelength of incident light and numeric aperture of the bulk imaging lens—an aperture defines a narrower field of view (i.e., a field of view of smaller diameter) and passes a sharper but lower-intensity (attenuated) signal from the bulk imaging optic 130 into its corresponding lens. The aperture layer 140 can therefore define apertures of diameter: greater than the diffraction-limited diameter for the wavelength of light output by the illumination sources (e.g., 900 nm); substantially greater than the thickness of the aperture layer 140; and less than the aperture pitch distance, which is substantially equivalent to the lens pitch distance and the pixel pitch distance. In one example, aperture layer 140 can define apertures of diameters approaching the diffraction-limited diameter to maximize geometrical selectivity of the field of view of each sense channel. Alternatively, the apertures can be of diameter less that the diffraction-limited diameter for the wavelength of light output by the illumination sources. In one example, the aperture layer 140 can define apertures of diameters matched to a power output of illumination sources in the system and to a number and photon detection capacity of subpixel photodetectors in each pixel in the set of pixels 170 to achieve a target number of photons incident on each pixel within each sampling period. In this example, each aperture can define a particular diameter that achieves target attenuation range for pixels originating from a corresponding illumination source and incident on the bulk imaging optic 130 during a sampling period. In particular, because an aperture in the aperture layer 140 attenuates a signal passed to its corresponding lens and on to its corresponding pixel, the diameter of the aperture can be matched to the dynamic range of its corresponding pixel.

In one implementation, a first aperture 141 in the aperture layer 140 passes light rays-reflected from a discrete region of a surface in the field (the field of view of the sense channel) ahead of the bulk imaging optic 130—into its corresponding lens; a stop region 146 interposed between the first aperture 141 and adjacent apertures in the aperture layer 140 blocks light rays—reflected from a region of the surface outside of the field of view of the first aperture 141—from passing into the lens corresponding to the first aperture 141. In the one-dimensional optical system 100, the aperture layer 140 therefore defines a column of apertures that define multiple discrete, non-overlapping fields of view of substantially infinite depth of field, as shown in FIG. 2.

In this implementation, a first aperture 141 in the aperture layer 140 defines a field of view that is distinct and that does not intersect a field of view defined by another aperture in the aperture layer 140, as shown in FIG. 2. The set of illumination sources 110 includes a first illumination source 111 paired with the first aperture 141 and configured to project an illuminating beam substantially aligned with (i.e., overlapping) the field of view of the first aperture 141 in the field ahead of the bulk imaging optic 130. Furthermore, the first illumination source 111 and a bulk transmitting optic 120 can cooperate to project an illuminating beam of a cross-section substantially similar to (and slightly larger than) the cross section of the field of view of the first aperture 141 as various distances from the bulk imaging optic 130. Therefore light output by the first illumination source 111—paired with the first aperture 141—and projected into the field of view of the first aperture 141 can remain substantially outside the fields of view of other apertures in the aperture layer 140.

Generally, photons projected into the field by the first illumination source 111 illuminate a particular region of a surface (or multiple surfaces) in the field within the field of view of the first sense channel and are reflected (e.g., scattered) by the surface(s); at least some of these photons reflected by the particular region of a surface may reach the bulk imaging optic 130, which directs these photons toward the focal plane. Because these photons were reflected by a region of a surface within the field of view of the first aperture 141, the bulk imaging optic 130 may project these photons into the first aperture 141, and the first aperture 141 may pass these photons into the first lens 151 (or a subset of these photons incident at an angle relative to the axis of the first aperture 141 below a threshold angle). However, because a second aperture 142 in the aperture layer 140 is offset from the first aperture 141 and because the particular region of the surface in the field illuminated via the first illumination source 111 does not (substantially) coincide with the field of view of the second aperture 142, photons reflected by the particular region of the surface and reaching the bulk imaging optic 130 are projected into the second aperture 142 and passed to a second lens 152 behind the second aperture 142, and vice versa, as shown in FIG. 2. Furthermore, a stop region 146 between the first and second apertures 142 can block photons directed toward the focal plane between the first and second apertures 142 reflected by the bulk imaging optic 130, thereby reducing crosstalk between the first and second sense channels.

Figure 4:
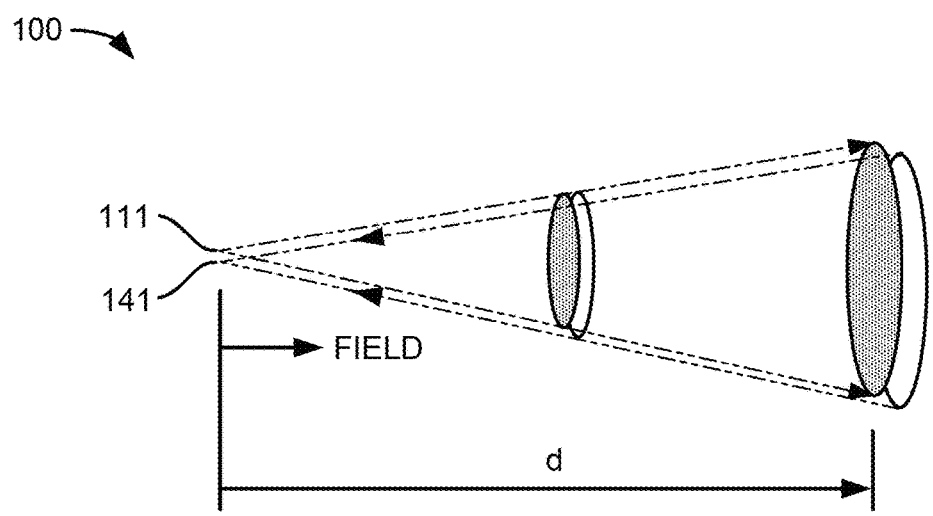
FIG. 4 is a schematic representation in accordance with one variation of the system.

For a first aperture 141 in the aperture layer 140 paired with a first illumination source 111 in the set of illumination sources 110, the first aperture 141 in the aperture layer 140 defines a first field of view and passes—into the first lens 151—incident light rays originating at or reflected from a surface in the field coinciding with the first field of view. Because the first illumination source 111 projects an illuminating beam that is substantially coincident (and substantially the same size as or minimally larger than) the field of view defined by the first aperture 141 (as shown in FIG. 4), a signal passed into the first lens 151 by the first aperture 141 in the aperture layer 140 can exhibit a relatively high ratio of light rays originating from the first illumination source 111 to light rays originating from other illumination sources in the system. Generally, because various illumination sources in the system may output illuminating beams at different frequencies, duty cycles, and/or power levels, etc. at a particular time during operation, light rays passed from the bulk imaging optic 130 into a first pixel 171 in the set of pixels 170 but originating from an illumination source other than the first illumination source 111 paired with the first pixel 171 constitute noise at the first pixel 171. Though the relatively small diameters of apertures in the aperture layer 140 may attenuate a total light signal passed from the bulk imaging optic 130 into the set of lenses 150, each aperture in the aperture layer 140 may pass a relatively high proportion of photons originating from its corresponding illumination source than from other illumination sources in the system; that is, due to the geometry of a particular aperture and its corresponding illumination source, a particular aperture may pass a signal exhibiting a relatively high SNR to its corresponding lens and thus into its corresponding pixel. Furthermore, at smaller aperture diameters in the aperture layer 140—and therefore smaller fields of view of corresponding channels—the system can pass less noise from solar radiation or other ambient light sources to the set of pixels 170.

In one variation, the system includes a second aperture layer interposed between the lens array and the optical filter 160, wherein the second aperture layer defines a second set of apertures 144, each aligned with a corresponding lens in the set of lenses 150, as described above. In this variation, an aperture in the second aperture layer 140 can absorb or reflect errant light rays passed by a corresponding lens, as described above, to further reduce crosstalk between channels, thereby improving SNR within the system. Similarly, the system can additionally or alternatively include a third aperture layer interposed between the optical filter 160 and the diffuser(s) 180, wherein the third aperture layer defines a third set of apertures 144, each aligned with a corresponding lens in the set of lenses 150, as described above. In this variation, an aperture in the third aperture layer can absorb or reflect errant light rays passed by the light filter, as described above, to again reduce crosstalk between channels, thereby improving SNR within the system.

1.4 Lens Array

The system includes a set of lenses 150, wherein each lens in the set of lenses 150 is characterized by a second focal length, is offset from the focal plane opposite the bulk imaging optic 130 by the second focal length, is aligned with a corresponding aperture in the set of apertures 144, and is configured to collimate light rays passed by the corresponding aperture. Generally, a lens in the set of lenses 150 functions to collimate lights rays passed by its corresponding aperture and to pass these collimated light rays into the optical filter 160.

In the one-dimensional optical system 100, the lenses are arranged in a single column, and adjacent lenses are offset by a uniform lens pitch distance (i.e., a center-to-center-distance between adjacent pixels), as shown in FIG. 3. The set of lenses 150 is interposed between the aperture layer and the optical filter 160. In particular, each lens can include a converging lens characterized by a second focal length and can be offset from the focal plane of the bulk imaging optic 130—opposite the bulk imaging optic 130—by the second focal length to preserve the aperture of the bulk imaging optic 130 and to collimate light incident on the bulk imaging optic 130 and passed by a corresponding aperture. Each lens in the set of lens can be characterized by a relatively short focal length (i.e., less than a focal length of the bulk imaging optic 130) and a relatively large marginal ray angle (e.g., a relatively high numeric aperture lens) such that the lens can capture highly-angled light rays projected toward the lens by the extent of the bulk imaging optic 130. That is, each lens in the set of lens can be characterized by a ray cone substantially matched to a ray cone of the bulk imaging optic 130.

Lenses in the set of lenses 150 can be substantially similar. A lens in the set of lenses 150 is configured to collimate light rays focused into its corresponding aperture by the bulk imaging optic 130. For example, a lens in the set of lenses 150 can include a bi-convex or plano-convex lens characterized by a focal length selected based on the size (e.g., diameter) of its corresponding aperture and the operating wavelength of the system. In this example, the focal length (f) of a lens in the set of lenses 150 can be calculated according to the formula:

$$f = \frac{d^2}{2\lambda}$$

where d is the diameter of the corresponding aperture in the aperture layer and $\lambda$ is the operating wavelength of light output by the illumination source (e.g., 900 nm). The geometry of a lens in the set of lenses 150 can therefore be matched to the geometry of a corresponding aperture in the aperture layer such that the lens passes a substantially sharp image of light rays—at or near the operating wavelength-into the optical filter 160 and thus on to the pixel array.

However, the set of lenses 150 can include lenses of any other geometry and arranged in any other way adjacent the aperture layer.

1.5 Optical Filter

As shown in FIG. 3, the system includes an optical filter 160 adjacent the set of lenses 150 opposite the aperture layer and configured to pass light rays at the operating wavelength. Generally, the optical filter 160 receives electromagnetic radiation across a spectrum from the set of lenses 150, passes a relatively narrow band of electromagnetic radiation—including radiation at the operating wavelength—to the pixel array, and blocks electromagnetic radiation outside of the band. In particular, electromagnetic radiation other than electromagnetic radiation output by the illumination source—such as ambient light—incident on a pixel in the set of pixels 170 constitutes noise in the system. The optical filter 160 therefore functions to reject electromagnetic radiation outside of the operating wavelength or, more pragmatically, outside of a narrow wavelength band, thereby reducing noise in the system and increasing SNR.

In one implementation, the optical filter 160 includes an optical bandpass filter that passes a narrow band of electromagnetic radiation substantially centered at the operating wavelength of the system. In one example, the illumination sources output light (predominantly) at an operating wavelength of 900 nm, and the optical filter 160 is configured to pass light between 899.95 nm and 900.05 nm and to block light outside of this band.

The optical filter 160 may selectively pass and reject wavelengths of light as a function of angle of incidence on the optical filter 160. Generally, optical bandpass filters may pass wavelengths of light inversely proportional to their angle of incidence on the light optical bandpass filter. For example, for an optical filter 160 including a 0.5 nm-wide optical bandpass filter, the optical filter 160 may pass over 95% of electromagnetic radiation over a sharp band from 899.75 nm to 900.25 nm and reject approximately 100% of electromagnetic radiation below 899.70 nm and above 900.30 nm for light rays incident on the optical filter 160 at an angle of incidence of approximately 0°. However, in this example, the optical filter 160 may pass over 95% of electromagnetic radiation over a narrow band from 899.5 nm to 900.00 nm and reject approximately 100% of electromagnetic radiation over a much wider band below 899.50 nm and above 900.30 nm for light rays incident on the optical filter 160 at an angle of incidence of approximately 15°. Therefore, the incidence plane of the optical filter 160 can be substantially normal to the axes of the lenses, and the set of lenses 150 can collimate light rays received through a corresponding aperture and output these light rays substantially normal to the incidence plane of the optical filter 160 (i.e., at an angle of incidence of approximately 0° on the optical filter). Specifically, the set of lenses 150 can output light rays toward the optical filter 160 at angles of incidence approximating 0° such that substantially all electromagnetic radiation passed by the optical filter 160 is at or very near the operating wavelength of the system.

In the one-dimensional optical system 100, the system can include a single optical filter 160 that spans the column of lens in the set of lenses 150. Alternatively, the system can include multiple optical filters 160, each adjacent a single lens or a subset of lenses in the set of lenses 150. However, the optical filter 160 can define any other geometry and can function in any other way to pass only a limited band of wavelengths of light.

1.6 Pixel Array and Diffuser

The system includes a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis. Generally, the set of pixels 170 are offset from the optical filter 160 opposite the set of lenses 150, and each pixel in the set of pixels 170 functions to output a single signal or stream of signals corresponding to the count of photons incident on the pixel within one or more sampling periods, wherein each sampling period may be picoseconds, nanoseconds, microseconds, or milliseconds in duration.

The system also includes a diffuser 180 interposed between the optical filter 160 and the set of pixels 170 and configured to spread collimated light output from each lens in the set of lenses 150 across a set of subpixels of a single corresponding pixel in the set of pixels 170. Generally, for each lens in the set of lenses 150, the diffuser 180 functions to spread light rays-previously collimated by the lens and passed by the optical filter 160—across the width and height of a sensing area within a corresponding pixel. The diffuser 180 can define a single optic element spanning the set of lenses 150, or the diffuser 180 can include multiple discrete optical elements, such as including one optical diffuser element aligned with each channel in the system.

Figure 5:
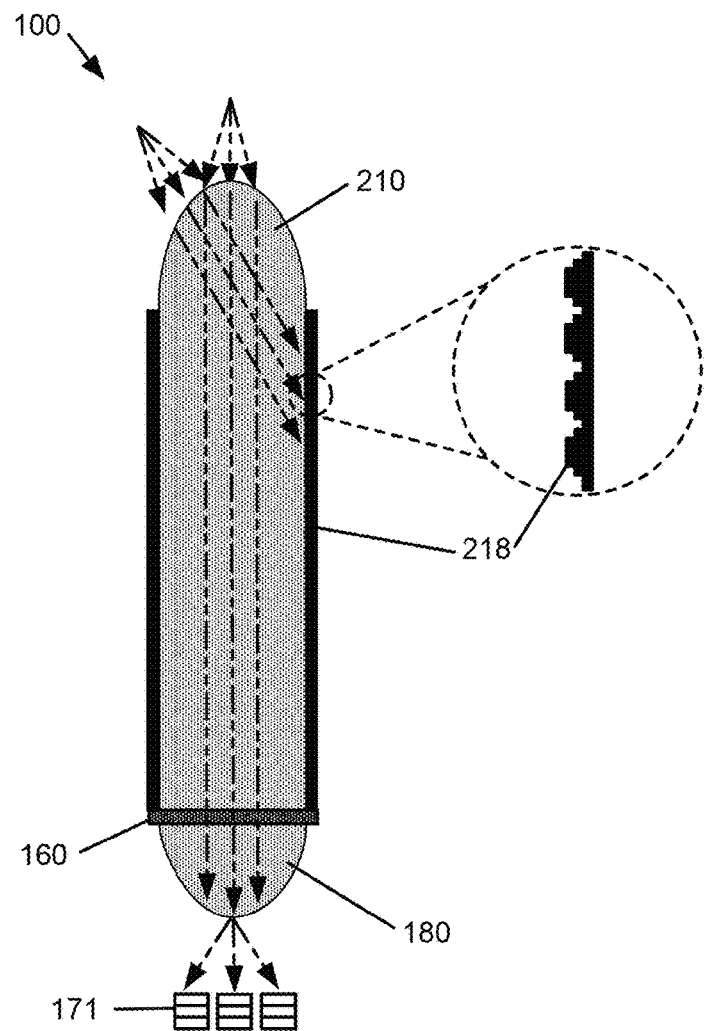
FIG. 5 is a schematic representation in accordance with one variation of the system.

In one implementation, a first pixel 171 in the set of pixels 170 includes an array of single-photon avalanche diode detectors (hereinafter "SPADs"), and the diffuser 180 spreads lights rays-previously passed by a corresponding first aperture 141, collimated by a corresponding first lens 151, and passed by the optical filter 160—across the area of the first pixel 171, as shown in FIGS. 3, 5, and 6. Generally, adjacent apertures can be aligned and offset vertically by an aperture pitch distance, adjacent lenses can be aligned and offset vertically by a lens pitch distance substantially identical to the aperture pitch distance, and adjacent pixels can be aligned and offset vertically by a pixel pitch distance substantially identical to the lens and aperture pitch distances. However, the pixel pitch distance may accommodate only a relatively small number of (e.g., two) vertically-stacked SPADs. Each pixel in the set of pixels 170 can therefore define an aspect ratio greater than 1:1, and the diffuser 180 can spread light rays passed by the optical filter 160 according to the geometry of a corresponding pixel in order to accommodate a larger sensing area per pixel.

In one example, each pixel in the set of pixels 170 is arranged on an image sensor, and a first pixel 171 in the set of pixels 170 includes a single row of 16 SPADs spaced along a lateral axis perpendicular to a vertical axis bisecting the column of apertures and lenses. In this example, the height of a single SPAD in the first pixel 171 can be less than the height (e.g., diameter) of the first lens 151, but the total length of the 16 SPADs can be greater than the width (e.g., diameter) of the first lens 151; the diffuser 180 can therefore converge light rays output from the first lens 151 to a height corresponding to the height of a SPAD at the plane of the first pixel 171 and can diverge light rays output from the first lens 151 to a width corresponding to the width of the 16 SPADs at the plane of the first pixel 171. In this example, the remaining pixels in the set of pixels 170 can include similar rows of SPADs, and the diffuser 180 can similarly converge and diverge light rays passed by corresponding apertures onto corresponding pixels.

In the foregoing example, the aperture layer can include a column of 16 like apertures, the set of lenses 150 can include a column of 16 like lenses arranged behind the aperture layer, and the set of pixels 170 can include a set of 16 like pixels—each including a similar array of SPADs—arranged behind the set of lenses 150. For a 6.4 mm-wide, 6.4 mm-tall image sensor, each pixel can include a single row of 16 SPADs, wherein each SPAD is electrically coupled to a remote analog front-end processing electronics/digital processing electronics circuit 240. Each SPAD can be arranged in a 400 μm-wide, 400 μm-tall SPAD area and can define an active sensing area approaching 400 μm in diameter. Adjacent SPADs can be offset by a SPAD pitch distance of 400 μm. In this example, the aperture pitch distance along the vertical column of apertures, the lens pitch distance along the vertical column of lenses, and the pixel pitch distance along the vertical column of pixels can each be approximately 400 μm accordingly. For the first sense channel in the system (i.e., the first aperture 141, the first lens 151, and the first pixel 171, etc.), a first diffuser 180 can diverge a cylindrical column of light rays passed from the first lens 151 through the optical filter 160—such as a column of light approximately 100 μm in diameter for an aperture layer aspect ratio of 1:4—to a height of approximately 400 μm aligned vertically with the row of SPADs in the first pixel 171. The first diffuser can similarly diverge the cylindrical column of light rays passed from the first lens 151 through the optical filter 160 to a width of approximately 6.4 μm centered horizontally across the row of SPADs in the first pixel 171. Other diffusers 180 in the system can similarly diverge (or converge) collimated light passed by corresponding lenses across corresponding pixels in the set of pixels 170. Therefore, in this example, by connecting each SPAD (or each pixel) to a remote analog front-end processing electronics/digital processing electronics circuit 240 and by incorporating diffusers 180 that spread light passed by the optical filter 160 across the breadths and heights of corresponding pixels, the system can achieve a relatively high sensing area fill factor across the imaging sensor.

Therefore, in the one-dimensional optical system 100, pixels in the set of pixels 170 can include an array of multiple SPADS arranged in aspect ratio exceeding 1:1, and the diffuser 180 can spread light rays across corresponding non-square pixels that enables a relatively large numbers of SPADs to be tiled across a single pixel to achieve a greater dynamic range across the image sensor than an image sensor with a single SPAD per pixel, as shown in FIG. 3. In particular, by incorporating multiple SPADs per pixel (i.e., per sense channel), a first sense channel in the system can detect multiple incident photons—originating from a surface in the field bound by a field of view defined by the first aperture 141—within the span of the dead time characteristic of the SPADs. The first sense channel can therefore detect a "brighter" surface in its field of view. Additionally or alternatively, the first pixel 171 in the first sense channel can be sampled faster than the dead time characteristic of SPADs in the first pixel 171 because, though a first subset of SPADs in the first pixel 171 may be down (or "dead") during a first sampling period due to collection of incident photons during the first sampling period, other SPADs in the first pixel 171 remain on (or "alive") and can therefore collect incident photons during a subsequent sampling period. Furthermore, by incorporating pixels characterized by relatively high aspect ratios of photodetectors, the image sensor can include pixels offset by a relatively small pixel pitch, but the system 100 can still achieve a relatively high dynamic range pixel.

However, pixels in the set of pixels 170 can include any other number of SPADs arranged in any other arrays, such as in a 64-by-1 grid array (as described above), in a 32-by-2 grid array, or in a 16-by-4 grid array, and the diffuser 180 can converge and/or diverge collimated light rays onto corresponding pixels accordingly in any other suitable way. Furthermore, rather than (or in addition to) SPADs, each pixel in the set of pixels 170 can include one or more linear avalanche photodiodes, Geiger mode avalanche photodiodes, photomultipliers, resonant cavity photodiodes, QUANTUM DOT detectors, or other types of photodetectors arranged as described above, and the diffuser(s) 180 can similarly converge and diverge signals passed by the optical filter(s) 160 across corresponding pixels, as described herein.

1.7 Illumination Sources

The system includes a set of illumination sources 110 arranged along a first axis, each illumination source in the set of illumination sources 110 configured to output an illuminating beam of an operating wavelength toward a discrete spot in a field ahead of the illumination source. Generally, each illumination source functions to output an illuminating beam coincident a field of view defined by a corresponding aperture in the set of apertures 144, as shown in FIGS. 1 and 2.

In one implementation, the set of illumination sources 110 includes a bulk transmitter optic and one discrete emitter per sense channel. For example, the set of illumination sources 110 can include a monolithic VCSEL arrays including a set of discrete emitters. In this implementation, the bulk transmitter optic can be substantially identical to the bulk imaging optic 130 in material, geometry (e.g., focal length), thermal isolation, etc., and the bulk transmitter optic is adjacent and offset laterally and/or vertically from the bulk imaging optic 130. In a first example, set of illumination sources 110 includes a laser array including discrete emitters arranged in a column with adjacent emitters offset by an emitter pitch distance substantially identical to the aperture pitch distance. In this first example, each emitter outputs an illuminating beam of diameter substantially identical to or slightly greater than the diameter of a corresponding aperture in the apertures layer, and the column of emitters is arranged along the focal plane of the bulk transmitter optic such that each illuminating beam projected from the bulk transmitter optic into the field intersects and is of substantially the same size and geometry as the field of view of the corresponding sense channel, as shown in FIG. 4. Therefore, substantially all power output by each emitter in the set of illumination sources 110 can be projected into the field of view of its corresponding sense channel with relatively minimal power wasted illuminating surfaces in the field outside of the fields of view of the sense channels.

In a second example, the discrete emitters are similarly arranged in a column with adjacent emitters offset by an emitter pitch distance twice the aperture pitch distance, as shown in FIG. 2. In this second example, each emitter is characterized by an illuminating active area (or aperture) of diameter approximately (or slightly greater than) twice the diameter of a corresponding aperture in the apertures layer, and the column of emitters is offset behind the bulk transmitter optic by twice the focal length of the bulk transmitter optic such that each illuminating beam projected from the bulk transmitter optic into the field intersects and is of substantially the same size and geometry as the field of view of the corresponding sense channel, as described above. Furthermore, for the same illumination beam power density, an illuminating beam output by an emitter in this second example may contain four times the power of an illuminating beam output by an emitter in the first example described above. The system can therefore include a set of emitter arranged according to an emitter pitch distance, configured to output illuminating beams of diameter, and offset behind the bulk transmitter optic by an offset distance as a function of a scale factor (e.g., 2.0 or 3.0) and 1) the aperture pitch distance in the aperture layer, 2) the diameter of apertures in the aperture layer, and 3) the focal length of bulk transmitter optic, respectively. The system can therefore include an illuminating subsystem that is proportionally larger than a corresponding receiver subsystem to achieve greater total output illumination power within the same beam angles and fields of view of corresponding channels in the receiver subsystem.

The system can also include multiple discrete sets of illumination sources, each set of illumination sources 110 paired with a discrete bulk transmitter optic adjacent the bulk imaging optic 130. For example, the system can include a first bulk transmitter optic, a second bulk transmitter optic, and a third bulk transmitter optic patterned radially about the bulk imaging optic 130 at a uniform radial distance from the center of the bulk imaging optic 130 and spaced apart by an angular distance of 120°. In this example, the system can include a laser array with one emitter—as described above—behind each of the first, second, and third bulk transmitter optics. Each discrete laser array and its corresponding bulk transmitter optic can thus project a set of illuminating beams into the fields of view of defined by corresponding in the apertures in the aperture layer. Therefore, in this example, the three discrete laser arrays and the three corresponding bulk transmitter optics can cooperate to project three times the power onto the fields of view of the sense channels in the system, as compared to a single laser array and one bulk transmitter optic. Additionally or alternatively, the system can include multiple discrete layer arrays and bulk transmitter optics to both: 1) achieve a target illumination power output into the field of view of each sensing channel in the receiver subsystem with multiple lower-power emitters per sensing channel; and 2) distribute optical energy over a larger area in the near-field to achieve an optical energy density less than a threshold allowable optical energy density for the human eye.

However, the system can include any other number and configuration of illumination source sets and bulk transmitter optics configured to illuminate fields of view defined by the sense channels. The set of illumination sources 110 can also include any other suitable type of optical transmitter, such as a 1×16 optical splitter powered by a single laser diode, a side-emitting laser diode array, an LED array, or a quantum dot LED array, etc.

1.8 Fabrication

In one implementation, the bulk receiver lens, the aperture layer, the set of lenses 150, the optical filter 160, and the diffuser 180 are fabricated and then aligned with and mounted onto an image sensor. For example, the optical filter 160 can be fabricated by coating a fused silica substrate. Photoactive optical polymer can then be deposited over the optical filter 160, and a lens mold can be placed over the photoactive optical polymer and a UV light source activated to cure the photoactive optical polymer in the form of lenses patterned across the optical filter 160. Standoffs can be similarly molded or formed across the optical filter 160 via photolithography techniques, and an aperture layer defined by a selectively-cured, metallized glass wafer can then be bonded or otherwise mounted to the standoffs to form the aperture layer. The assembly can then be inverted, and a set of discrete diffusers and standoffs can be similarly fabricated across the opposite side of the optical filter 160. A discrete image sensor can then be aligned with and bonded to the standoffs, and a bulk imaging optic 130 can be similarly mounted over the aperture layer.

Alternatively, photolithography and wafer level bonding techniques can be implemented to fabricate the bulk imaging optics, the aperture layer, the set of lenses 150, the optical filter 160, and the diffuser 180 directly on to the un-diced semiconductor wafer containing the detector chips in order to simplify manufacturing, reduce cost, and reduce optical stack height for decreased pixel crosstalk.

2. One-Dimensional Optical System: Lens Tube

One variation of the system includes: a set of illumination sources 110 arranged along a first axis, each illumination source in the set of illumination sources 110 configured to output an illuminating beam of an operating wavelength toward a discrete spot in a field ahead of the illumination source; a bulk imaging optic 130 characterized by a focal plane opposite the field; a set of lens tubes 210 arranged in a line array parallel to the first axis, each lens tube in the set of lens tubes 210 including: a lens characterized by a focal length, offset from the focal plane by the focal length, and configured to collimate light rays reflected into the bulk imaging optic 130 from a discrete spot in the field illuminated by a corresponding illumination source in the set of optics into the bulk imaging optic 130; and a cylindrical wall 218 extending from the lens opposite the focal plane, defining a long axis substantially perpendicular to the first axis, and configured to absorb incident light rays reflected into the bulk imaging optic 130 from a region in the field outside the discrete spot illuminated by the corresponding illumination source. In this variation, the system also includes: an optical filter 160 adjacent the set of lens tubes 210 opposite the focal plane and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels aligned along a third axis perpendicular to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

Figure 7:
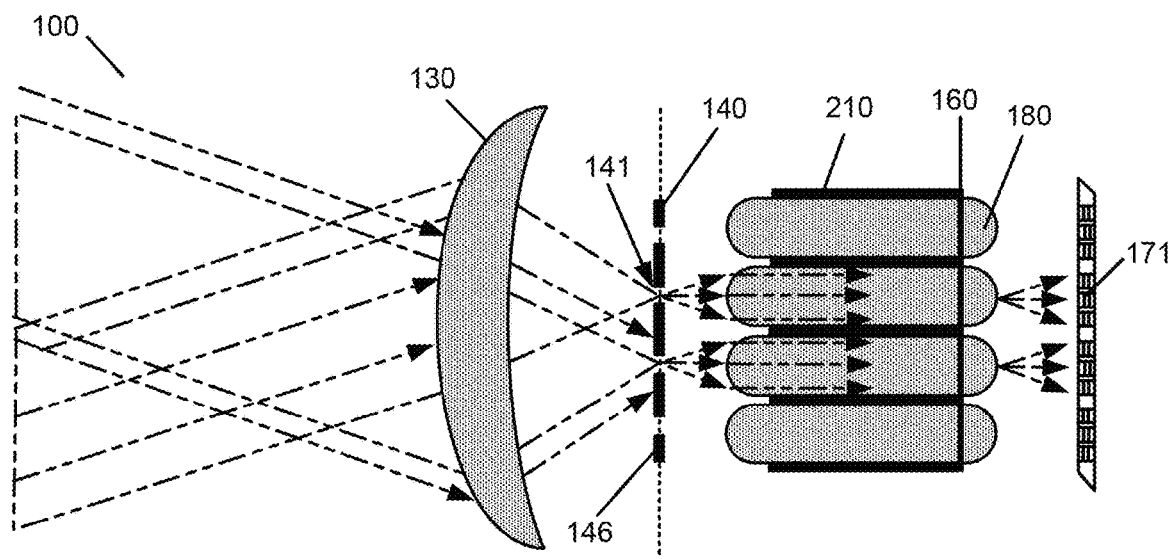
FIG. 7 is a schematic representation in accordance with one variation of the system.

Generally, in this variation, the system includes a lens tube in replacement of (or in addition to) each aperture and lens pair described above. In this variation, each lens tube can be characterized by a second (short) focal length and can be offset from the focal plane of the bulk imaging optic 130 by the second focal length to preserve the aperture of the bulk imaging optic 130 and to collimate incident light received from the bulk imaging optic 130, as described above and as shown in FIGS. 5 and 7.

Each lens tube also defines an opaque cylindrical wall 218 defining an axis normal to the incidence plane of the adjacent optical filter 160 and configured to absorb incident light rays, as shown in FIG. 5. Generally, at greater axial lengths, the cylindrical wall 218 of a lens tube may absorb light rays passing through the lens tube at shallower angles to the axis of the lens tube, thereby reducing the field of view of the lens tube (which may be similar to decreasing the diameter of an aperture in the aperture layer up to the diffraction-limited diameter, as described above) and yielding an output signal of collimated light rays nearer to perpendicular to the incidence plane of the optical filter 160. Each lens tube can therefore define an elongated cylindrical wall 218 of length sufficient to achieve a target field of view and to pass collimated light rays at maximum angles to the axis of the lens tube less than a threshold angle. In this variation, a lens tube can thus function as an aperture-sense pair described above to define a narrow field of view and to output substantially collimated light to the adjacent optical filter 160.

The cylindrical wall 218 of a lens tube can define a coarse or patterned opaque interface about a transparent (or translucent) lens material, as shown in FIG. 5, to increase absorption and decrease reflection of light rays incident on the cylindrical wall 218. Each lens tube (and each lens described above) can also be coated with an anti-reflective coating.

Figure 9:
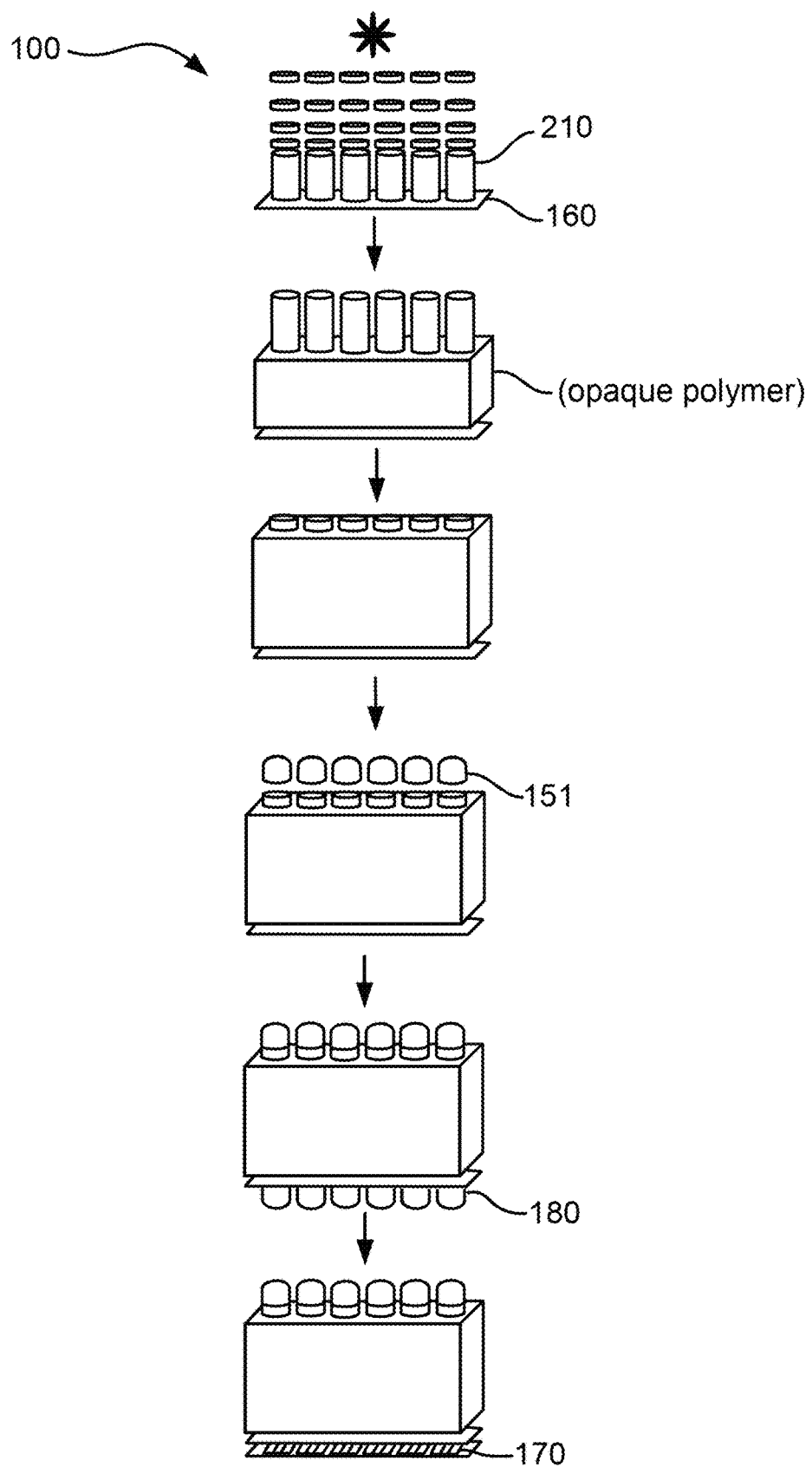
FIG. 9 is a flowchart representation in accordance with one variation of the system.
Figure 10:
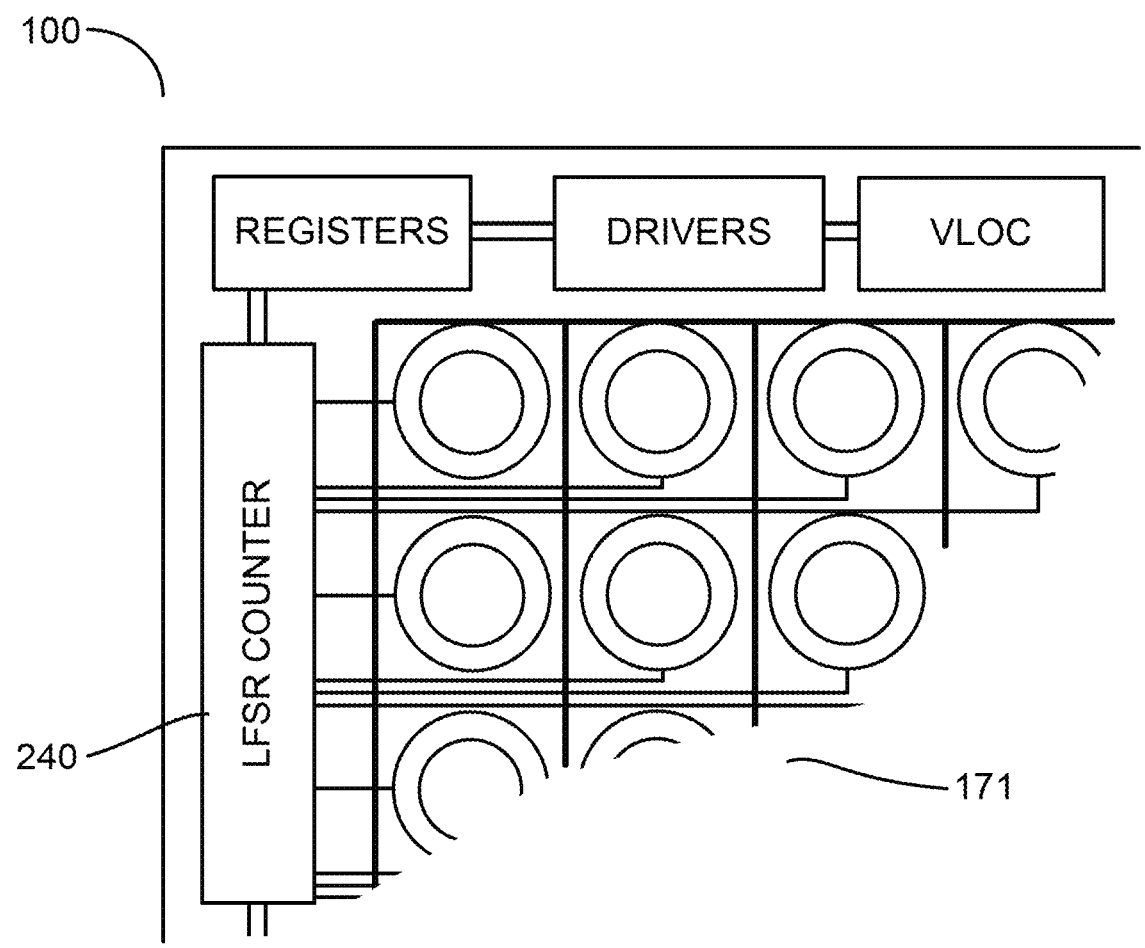
FIG. 10 is a schematic representation in accordance with one variation of the system.

As shown in FIG. 9, in this variation, the set of lens tubes 210 can be fabricated by implementing photolithography techniques to pattern a photoactive optical polymer (e.g., SU8) onto the optical filter 160 (e.g., on a silicon wafer defining the optical filter). A light-absorbing polymer can then be poured between the lens tubes and cured. A set of lenses 150 can then be fabricated (e.g., molded) separately and then bonded over the lens tubes. Alternatively, lenses can be fabricated directly onto the lens tubes by photolithography techniques. Yet alternatively, a mold for lenses can be cast directly onto the lens tubes by injecting polymer into a mold arranged over the lens tubes. A singular diffuser 180 or multiple discrete diffusers 180 can be similarly fabricated and/or assembled on the optical filter 160 opposite the lens tubes. Standoffs extending from the optical filter 160 can be similarly fabricated or installed around the diffuser(s) 180, and the image sensor can be aligned with and bonded to the standoffs opposite the optical filter 160. Other optical elements within the system (e.g., the bulk imaging lens, the bulk transmitting lens, etc.) can be fabricated according to similar techniques and with similar materials.

3. Two-Dimensional Optical System

Another variation of the system includes: a set of illumination sources 110 arranged in a first rectilinear grid array, each illumination source in the set of illumination sources 110 configured to output an illuminating beam of an operating wavelength toward a discrete spot in a field ahead of the illumination source; a bulk imaging optic 130 characterized by a focal plane opposite the field; an aperture layer coincident the focal plane, defining a set of apertures 144 in a second rectilinear grid array proportional to the first rectilinear grid array, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer and configured to pass light rays at the operating wavelength; a set of pixels 170 adjacent the optical filter 160 opposite the set of lenses 150, each pixel in the set of pixels 170 aligned with a subset of lenses in the set of lenses 150; and a diffuser 180 interposed between the optical filter 160 and the set of pixels 170 and configured to spread collimated light output from each lens in the set of lenses 150 across a corresponding pixel in the set of pixels 170.

Generally, in this variation, the system includes a two-dimensional grid array of channels (i.e., aperture, lens, and pixel sets or lens tube and pixel sets) and is configured to image a volume occupied by the system in two dimensions. The system can collect one-dimensional distance data—such as counts of incident photons within a sampling period and/or times between consecutive photons incident on pixels of known position corresponding to known fields of view in the field—across a two-dimensional field. The one-dimensional distance data can then be merged with known positions of the fields of view for each channel in the system to reconstruct a virtual three-dimensional representation of the field ahead of the system.

In this variation, the aperture layer can define a grid array of apertures, the set of lenses 150 can be arranged in a similar grid array with one lens aligned with one aperture in the aperture layer, and the set of pixels 170 can include one pixel per aperture and lens pair, as described above. For example, the aperture layer can define a 24-by-24 grid array of 200-μm-diameter apertures offset vertically and laterally by an aperture pitch distance of 300 μm, and the set of lenses 150 can similarly define a 24-by-24 grid array of lenses offset vertically and laterally by a lens pitch distance of 300 μm. In this example, the set of pixels 170 can include a 24-by-24 grid array of 300-μm-square pixels, wherein each pixel includes a 3×3 square array of nine 100-μm-square SPADs.

Figure 8:
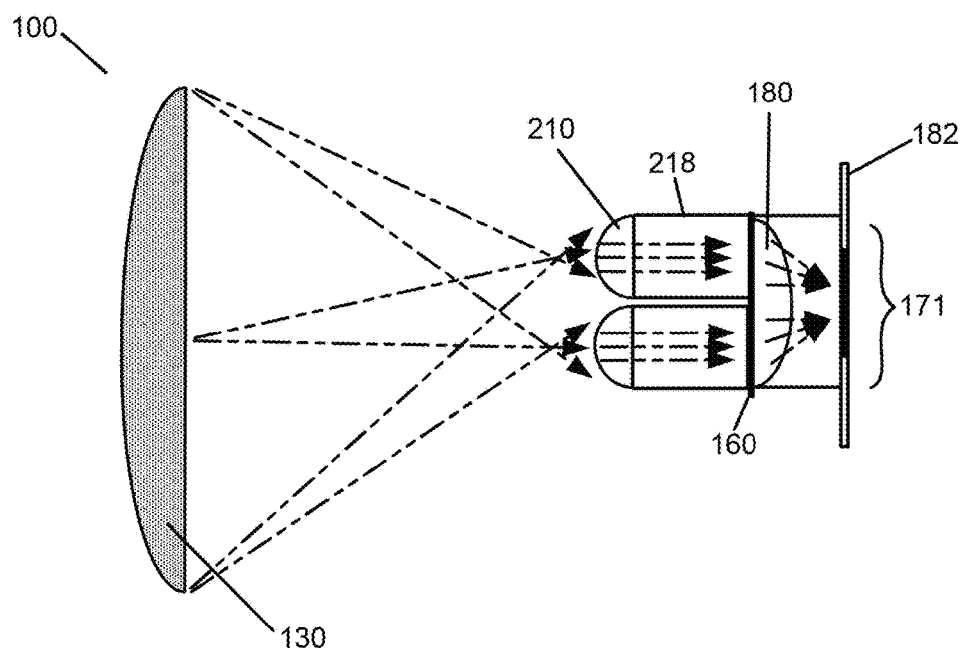
FIG. 8 is a schematic representation in accordance with one variation of the system.

Alternatively, in this variation, the set of pixels 170 can include one pixel per group of multiple aperture and lens pairs. In the foregoing example, the set of pixels 170 can alternatively include a 12-by-12 grid array of 600-μm-square pixels, wherein each pixel includes a 6×6 square array of 36 100-μm-square SPADs and wherein each pixel is aligned with a group of four adjacent lenses in a square grid. In this example, for each group of four adjacent lenses, the diffuser 180: can bias collimated light rays output from a lens in the (1,1) position in the square grid upward and to the right to spread light rays passing through the (1,1) lens across the full breadth and width of the corresponding pixel; can bias collimated light rays output from a lens in the (2,1) position in the square grid upward and to the left to spread light rays passing through the (2,1) lens across the full breadth and width of the corresponding pixel; can bias collimated light rays output from a lens in the (1,2) position in the square grid downward and to the right to spread light rays passing through the (1,2) lens across the full breadth and width of the corresponding pixel; and can bias collimated light rays output from a lens in the (2,2) position in the square grid downward and to the left to spread light rays passing through the (2,2) lens across the full breadth and width of the corresponding pixel, as shown in FIG. 8.

In the foregoing example, for each group of four illumination sources in a square grid and corresponding to one group of four lenses in a square grid, the system can actuate one illumination source in the group of four illumination sources at any given instance in time. In particular, for each group of four illumination sources in a square grid corresponding to one pixel in the set of pixels 170, the system can actuate a first illumination source 111 in a (1,1) position during a first sampling period to illuminate a field of view defined by a first aperture 141 corresponding to a lens in the (1,1) position in the corresponding group of four lenses, and the system can sample all 36 SPADs in the corresponding pixel during the first sampling period. The system can then shut down the first illumination source 111 and actuate a second illumination source 112 in a (1,2) position during a subsequent second sampling period to illuminate a field of view defined by a second aperture 142 corresponding to a lens in the (1,2) position in the corresponding group of four lenses, and the system can sample all 36 SPADs in the corresponding pixel during the second sampling period. Subsequently, the system can then shut down the first and second illumination sources 112 and actuate a third illumination source in a (2,1) position during a subsequent third sampling period to illuminate a field of view defined by a third aperture corresponding to a lens in the (2,1) position in the corresponding group of four lenses, and the system can sample all 36 SPADs in the corresponding pixel during the third sampling period. Finally, the system can shut down the first, second, and third illumination sources and actuate a fourth illumination source in a (2,2) position during a fourth sampling period to illuminate a field of view defined by a fourth aperture corresponding to a lens in the (2,2) position in the corresponding group of four lenses, and the system can sample all 36 SPADs in the corresponding pixel during the fourth sampling period. The system can repeat this process throughout its operation.

Therefore, in the foregoing example, the system can include a set of pixels 170 arranged across an image sensor 7.2 mm in width and 7.2 mm in length and can implement a scanning schema such that each channel in the system can access (can project light rays onto) a number of SPADs otherwise necessitating a substantially larger image sensor (e.g., a 14.4 mm by 14.4 mm image sensor). In particular, the system can implement a serial scanning schema per group of illumination sources to achieve an exponential increase in the dynamic range of each channel in the system. In particular, in this variation, the system can implement the foregoing imaging techniques to increase imaging resolution of the system.

In the foregoing implementation, the system can also include a shutter 182 between each channel and the image sensor, and the system can selectively open and close each shutter 182 when the illumination source for the corresponding channel is actuated and deactivated, respectively. For example, the system can include one independently-operable electrochromic shutter 182 interposed between each lens, and the system can open the electrochromic shutter 182 over the (1,1) lens in the square-gridded group of four lenses and close electrochromic shutters 182 over the (1,2), (2,1), and (2,2) lens when the (1,1) illumination source is activated, thereby rejecting noise passing through the (1,2), (2,1), and (2,2) lens from reaching the corresponding pixel on the image sensor. The system can therefore selectively open and close shutters 182 between each channel and the image sensor to increase SNR per channel during operation. Alternatively, the system can include one independently-operable electrochromic shutter 182 arranged over select regions of each pixel, as shown in FIG. 8, wherein each electrochromic shutter 182 is aligned with a single channel (i.e., with a single lens in the set of lenses). The system can alternatively include MEMS mechanical shutters or any other suitable type of shutter interposed between the set of lenses 150 and the image sensor.

In this variation, the system can define two-dimension grid arrays of apertures, lenses, diffusers, and/or pixels characterized by a first pitch distance along a first (e.g., X) axis and a second pitch distance—different from the first pitch distance—along a second (e.g., Y) axis. For example, the image sensor can include pixels offset by a 25 μm horizontal pitch and a 300 μm vertical pitch, wherein each pixel includes a single row of twelve subpixels.

However, in this variation, the two-dimensional optical system can include an array of any other number and pattern of channels (e.g., apertures, lenses (or lens tubes), and diffusers) and pixels and can execute any other suitable scanning schema to achieve higher spatial resolutions per channel than the raw pixel resolution of the image sensor. The system can additionally or alternatively include a converging optic, a diverging optic, and/or any other suitable type of optical element to spread light rights passed from a channel across the breadth of a corresponding pixel.

As a person skilled in the art will recognize from the previous detailed description and from the figures and claims, modifications and changes can be made to the embodiments of the invention without departing from the scope of this invention as defined in the following claims.

What is claimed is:

1. An optical system for collecting distance information, the optical system comprising:
   a bulk transmitting optic;

an emitter array including a plurality of optical emitters having an operating wavelength, each optical emitter in the plurality of optical emitters configured to output an illuminating beam of the operating wavelength through the bulk transmitting optic into a field external to the optical system;

a bulk imaging optic;

a detector array comprising a plurality of pixels arranged behind the bulk imaging optic and operable to detect photons emitted from the emitter array and received through the bulk imaging optic after being reflected from surfaces within the field;

a plurality of lens tubes positioned between the bulk imaging optic and the detector array, wherein each lens tube in the plurality of lens tubes is aligned with a corresponding pixel in the plurality of pixels and is configured to pass light rays reflected into the bulk imaging optic from a discrete spot in the field to its corresponding pixel while absorbing incident light rays reflected into the bulk imaging optic from regions in the field outside the discrete spot, and wherein each lens tube comprises a transparent lens material extending from a first end adjacent to the bulk imaging optic to a second end adjacent to its respective pixel and an elongated opaque cylindrical wall disposed about the transparent lens material; and one or more optical filters disposed in an optical path of the plurality of pixels and configured to allow a set of wavelengths of electromagnetic radiation, including the operating wavelength, to pass through the optical filter while blocking electromagnetic radiation outside the set of wavelengths from reaching the plurality of pixels.

2. The optical system set forth in claim 1 wherein the emitter array is arranged along a first plane and the elongated cylindrical wall of each lens tube defines an axis normal to an incidence plane of the one or more optical filters.

3. The optical system set forth in claim 2 wherein the cylindrical wall within each lens tube comprises a course or patterned opaque interface about a transparent lens material to increase absorption and decrease reflection of light rays incident on the cylindrical wall.

4. The optical system set forth in claim 1 wherein each optical emitter in the plurality of optical emitters is configured to output its illuminating beam of the operating wavelength towards a discrete spot in a field external to the optical system that is non-overlapping with the illuminating beams from all other optical emitters in the plurality of optical emitters.

5. The optical system set forth in claim 4 wherein each lens tube is configured to collimate light rays reflected into the bulk imaging optic from a discrete spot in the field illuminated by a corresponding optical emitter in the plurality of optical emitters.

6. The optical system set forth in claim 1 wherein the bulk image optic is characterized by a focal plane and each lens tube in the plurality of lens tubes is characterized by a focal length and offset from the focal plane of the bulk imaging optic by the focal length.

7. The optical system set forth in claim 1 wherein each pixel in the plurality of pixels comprises a set of subpixels.

8. The optical system set forth in claim 7 further comprising a diffuser interposed between the second end of each lens tube and the detector array, wherein the diffuser spreads collimated light from each lens tube in the plurality of lens tubes across the set of subpixels of a corresponding pixel in the plurality of pixels.

9. The optical system set forth in claim 7 wherein the set of subpixels in each pixel comprises a plurality of single photon avalanche diodes (SPADs).

10. The optical system set forth in claim 1 wherein each optical emitter in the plurality of optical emitters corresponds to one pixel in the plurality of pixels.

11. The optical system set forth in claim 1 wherein the plurality of lens tubes are arranged in a one-dimensional line array parallel to a first axis.

12. The optical system set forth in claim 1 wherein the plurality of lens tubes are arranged in a two-dimensional grid array.

13. An optical system for collecting distance information, the optical system comprising:

a bulk transmitting optic;

an emitter array including a plurality of optical emitters having an operating wavelength, each optical emitter in the plurality of optical emitters configured to output an illuminating beam of the operating wavelength through the bulk transmitting optic towards a discrete spot in a field external to the optical system that is non-overlapping with the illuminating beams from the other optical emitters in the plurality of optical emitters;

a bulk imaging optic;

a detector array comprising a plurality of pixels arranged behind the bulk imaging optic and operable to detect photons emitted from the emitter array and received through the bulk imaging optic after being reflected from surfaces within the field;

a plurality of lens tubes positioned between the bulk imaging optic and the detector array, wherein each lens tube in the plurality of lens tubes is aligned with a corresponding pixel in the plurality of pixels and is configured to pass light rays reflected into the bulk imaging optic from a discrete spot in the field to its corresponding pixel while absorbing incident light rays reflected into the bulk imaging optic from regions in the field outside the discrete spot, and wherein each lens tube comprises a transparent lens material extending from a first end adjacent to the bulk imaging optic to a second end adjacent to its respective pixel and an elongated opaque cylindrical wall disposed about the transparent lens material;

a plurality of shutters disposed between the plurality of lens tubes and the plurality of pixels, wherein each shutter in the plurality of shutters is aligned with a corresponding pixel in the plurality of pixels and is configured to open and close in conjunction with activation and deactivation of an optical emitter in the plurality of optical emitters that projects light into the field of view of the corresponding pixel; and an optical filter disposed in an optical path of the plurality of pixels and operable to allow a set of wavelengths of electromagnetic radiation, including the operating wavelength, to pass through the optical filter while blocking electromagnetic radiation outside the set of wavelengths from reaching the plurality of pixels.

14. The optical system set forth in claim 13 wherein each shutter in the plurality of shutters is an electrochromic shutter.

15. The optical system set forth in claim 13 wherein each shutter in the plurality of shutters is a MEMS mechanical shutter.

16. The optical system set forth in claim 13 wherein each lens tube in the plurality of lens tubes comprises a lens characterized by a focal length and offset from a focal plane of the bulk imaging optic by the focal length.

17. The optical system set forth in claim 16 wherein the emitter array is arranged along a first plane and each lens tube in the plurality of lens tubes comprises the cylindrical wall extending from the lens opposite the focal plane defining a long axis substantially perpendicular to the first plane.

18. The optical system set forth in claim 17 wherein the cylindrical wall within each lens tube is configured to absorb incident light rays reflected into the bulk imaging optic from a region in the field outside the discrete spot illuminated by its corresponding optical emitter.

19. The optical system set forth in claim 13 wherein each pixel in the plurality of pixels comprises a plurality of single photon avalanche diodes (SPADs).

20. The optical system set forth in claim 19 further comprising a diffuser interposed between the second end of each lens tube and the detector array, wherein the diffuser spreads collimated light from each lens in the plurality of lens tubes across the plurality of SPADs of a corresponding pixel in the plurality of pixels.

* * * * *